(12) United States Patent
Ikeda et al.

(10) Patent No.: US 12,436,096 B2
(45) Date of Patent: Oct. 7, 2025

(54) ULTRAVIOLET INSPECTION TOOL AND INSPECTION METHOD USING A VISUAL INDICATOR

(71) Applicant: FUJIFILM Corporation, Tokyo (JP)

(72) Inventors: Kimi Ikeda, Shizuoka (JP); Sotaro Inomata, Shizuoka (JP); Yusuke Sakai, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 191 days.

(21) Appl. No.: 18/465,992

(22) Filed: Sep. 13, 2023

(65) Prior Publication Data

US 2023/0417658 A1     Dec. 28, 2023

Related U.S. Application Data

(63) Continuation of application No. PCT/JP2022/010597, filed on Mar. 10, 2022.

(30) Foreign Application Priority Data

Mar. 22, 2021 (JP) .................................. 2021-047379
May 11, 2021 (JP) .................................. 2021-080384

(51) Int. Cl.
*G01N 21/33* (2006.01)
*G01N 21/31* (2006.01)

(52) U.S. Cl.
CPC ........... *G01N 21/33* (2013.01); *G01N 21/314* (2013.01); *G01N 2021/3166* (2013.01); *G01N 2021/3181* (2013.01); *G01N 2223/612* (2013.01)

(58) Field of Classification Search
CPC ... G01N 2021/3166; G01N 2021/3181; G01N 2223/612
See application file for complete search history.

(56) References Cited

U.S. PATENT DOCUMENTS

| | | | | |
|---|---|---|---|---|
| 5,387,798 A * | 2/1995 | Funakoshi | ............... | G01J 1/50 250/474.1 |
| 6,504,161 B1 * | 1/2003 | Jackson | ................... | G01J 1/50 250/474.1 |

(Continued)

FOREIGN PATENT DOCUMENTS

| | | |
|---|---|---|
| JP | S6089352 | 5/1985 |
| JP | H063188 | 1/1994 |

(Continued)

OTHER PUBLICATIONS

"International Search Report (Form PCT/ISA/210) of PCT/JP2022/010597", mailed on May 10, 2022, with English translation thereof, pp. 1-7.

(Continued)

*Primary Examiner* — Blake C Riddick
(74) *Attorney, Agent, or Firm* — JCIPRNET

(57) ABSTRACT

With the present invention, it is possible to provide an inspection tool capable of easily inspecting whether or not light which inactivates a virus or the like has been radiated and easily inspecting whether or not light which is harmful to the human body has been radiated. The inspection tool of the present invention includes a first display portion and a second display portion, in which the first display portion is a display portion which indicates a visual change before and after irradiation of the inspection tool with light having at least any of wavelengths in a wavelength range of 200 to 280 nm, and the second display portion is a display portion which does not indicate a visual change before and after irradiation of the inspection tool with light in a wavelength range of 200 to 230 nm, but indicates a visual change before and after irradiation of the inspection tool with light having at least any of wavelengths in a wavelength range of more than 230 nm and 280 nm or less.

18 Claims, 4 Drawing Sheets

(56) References Cited

U.S. PATENT DOCUMENTS

| | | |
|---|---|---|
| 2003/0165398 A1 | 9/2003 | Waldo et al. |
| 2015/0355021 A1 | 12/2015 | Hatta |
| 2017/0089760 A1 | 3/2017 | Hatta |
| 2017/0131144 A1 | 5/2017 | Hatta et al. |
| 2018/0169279 A1 | 6/2018 | Randers-Pehrson et al. |
| 2020/0085984 A1 | 3/2020 | Randers-Pehrson et al. |
| 2020/0215215 A1 | 7/2020 | Randers-Pehrson et al. |
| 2020/0234941 A1* | 7/2020 | Yagyu .................. H01J 61/025 |
| 2020/0306397 A1 | 10/2020 | Randers-Pehrson et al. |
| 2020/0353112 A1 | 11/2020 | Randers-Pehrson et al. |
| 2021/0236672 A1 | 8/2021 | Randers-Pehrson et al. |
| 2021/0346561 A1* | 11/2021 | Callahan .................. A61L 2/28 |
| 2021/0385317 A1* | 12/2021 | Crosby ................ A61N 5/0624 |

FOREIGN PATENT DOCUMENTS

| | | |
|---|---|---|
| JP | H0843197 | 2/1996 |
| JP | 3024525 | 5/1996 |
| JP | H0961235 | 3/1997 |
| JP | 2013172834 | 9/2013 |
| JP | 2014186031 | 10/2014 |
| JP | 2015191001 | 11/2015 |
| JP | 2018114197 | 7/2018 |
| JP | 2018517488 | 7/2018 |
| WO | 2016017701 | 2/2016 |
| WO | 2017158943 | 9/2017 |

OTHER PUBLICATIONS

"Written Opinion of the International Searching Authority (Form PCT/ISA/237) of PCT/JP2022/010597", mailed on May 10, 2022, with English translation thereof, pp. 1-9.

"Search Report of Europe Counterpart Application", issued on Jul. 30, 2024, p. 1-p. 5.

* cited by examiner

ULTRAVIOLET INSPECTION TOOL AND INSPECTION METHOD USING A VISUAL INDICATOR

CROSS-REFERENCE TO RELATED APPLICATIONS

This application is a Continuation of PCT International Application No. PCT/JP2022/010597 filed on Mar. 10, 2022, which claims priority under 35 U.S.C. § 119(a) to Japanese Patent Application No. 2021-047379 filed on Mar. 22, 2021 and Japanese Patent Application No. 2021-080384 filed on May 11, 2021. The above applications are hereby expressly incorporated by reference, in their entirety, into the present application.

BACKGROUND OF THE INVENTION

1. Field of the Invention

The present invention relates to an inspection tool and an inspection method.

2. Description of the Related Art

In recent years, attention has been paid to the fact that ultraviolet rays, particularly UV-C (having a wavelength of 200 to 280 nm) kill a virus or the like.

As the measurement of the amount of ultraviolet irradiation, for example, JP2015-191001A discloses a method of using "UV label" (UV-H manufactured by NiGK Corporation), and WO2017/158943A discloses a method of using "UV scale" (manufactured by FUJIFILM Corporation).

SUMMARY OF THE INVENTION

On the other hand, it has been known that UV-C also includes wavelengths harmful to the human body, and there is a concern about the influence of ultraviolet rays on the human body. Therefore, in particular, in a case where UV-C is used under manned conditions, it is desirable to be able to inspect whether or not light which inactivates a virus or the like has been radiated, and whether or not light which is harmful to the human body has been radiated.

In a case where the present inventors have inspected, using a known UV label and UV scale in the related art, whether or not light which inactivates a virus or the like has been radiated, and whether or not light which is harmful to the human body has been radiated, it has not been possible to inspect, at the same time, whether or not light which inactivates a virus or the like has been radiated, and whether or not light which is harmful to the human body has been radiated.

In view of the above-described circumstances, an object of the present invention is to provide an inspection tool capable of easily inspecting whether or not light which inactivates a virus or the like has been radiated and easily inspecting whether or not light which is harmful to the human body has been radiated.

Another object of the present invention is to provide an inspection method.

As a result of intensive studies to achieve the above-described objects, the present inventors have found that the above-described objects can be achieved by the following configurations, and have completed the present invention.

(1) An inspection tool comprising:
a first display portion; and
a second display portion,
in which the first display portion is a display portion which indicates a visual change before and after irradiation of the inspection tool with light having at least any of wavelengths in a wavelength range of 200 to 280 nm, and
the second display portion is a display portion which does not indicate a visual change before and after irradiation of the inspection tool with light in a wavelength range of 200 to 230 nm, but indicates a visual change before and after irradiation of the inspection tool with light having at least any of wavelengths in a wavelength range of more than 230 nm and 280 nm or less.

(2) The inspection tool according to (1),
in which the visual change is selected from the group consisting of a color change, a pattern change, a brightness change, a lighting change, and a combination of these changes.

(3) The inspection tool according to (1) or (2),
in which the second display portion includes a filter and a photosensitive portion which indicates a visual change before and after receiving light having at least any of wavelengths in a wavelength range of more than 230 nm and 280 nm or less, the light have passed through the filter, and
the filter shields light in the wavelength range of 200 to 230 nm.

(4) The inspection tool according to (3),
in which the photosensitive portion contains a color-forming agent.

(5) The inspection tool according to (1) or (2), further comprising:
a first light-receiving portion which receives light having at least any of wavelengths in the wavelength range of 200 to 280 nm;
a filter; and
a second light-receiving portion which receives light having at least any of wavelengths in a wavelength range of more than 230 nm and 280 nm or less, the light have passed through the filter,
in which the filter shields light in the wavelength range of 200 to 230 nm,
the first display portion indicates the visual change according to a light-receiving amount of the first light-receiving portion, and
the second display portion indicates the visual change according to a light-receiving amount of the second light-receiving portion.

(6) The inspection tool according to any one of (3) to (5),
in which a transmittance of the filter at a wavelength of 222 nm is 5% or less, and
a transmittance of the filter at a wavelength of 254 nm is 50% or more.

(7) The inspection tool according to any one of (3) to (6),
in which an average transmittance of the filter at a wavelength of 200 to 230 nm is 1% or less, and
an average transmittance of the filter at a wavelength of 230 to 280 nm is 50% or more.

(8) The inspection tool according to any one of (3) to (7),
in which the filter contains a resin selected from the group consisting of triacetyl cellulose, polyvinyl chloride, an acrylic resin, a methacrylic resin, polyurethane, and polyurea.

(9) The inspection tool according to (1) or (2),
in which the second display portion includes a second photosensitive portion which is not exposed to light in the wavelength range of 200 to 230 nm and indicates a visual change before and after being exposed to the light having at least any of wavelengths in a wavelength range of more than 230 nm and 280 nm or less, and the second photosensitive portion contains a compound which shields light having a wavelength of 200 to 230 nm.

(10) The inspection tool according to (9), in which a transmittance of the compound which shields light having a wavelength of 200 to 230 nm, at a wavelength of 222 nm, is 5% or less, and a transmittance of the compound which shields light having a wavelength of 200 to 230 nm at a wavelength of 254 nm is 50% or more.

(11) The inspection tool according to (9) or (10), in which the compound which shields light having a wavelength of 200 to 230 nm has any one partial structure selected from the group consisting of an ester bond, a urethane bond, and a urea bond.

(12) An inspection method using the inspection tool according to any one of (1) to (11).

According to the present invention, it is possible to provide an inspection tool capable of easily inspecting whether or not light which inactivates a virus or the like has been radiated and easily inspecting whether or not light which is harmful to the human body has been radiated.

In addition, according to the present invention, it is possible to provide an inspection method.

DESCRIPTION OF THE PREFERRED EMBODIMENTS

Figure 1:
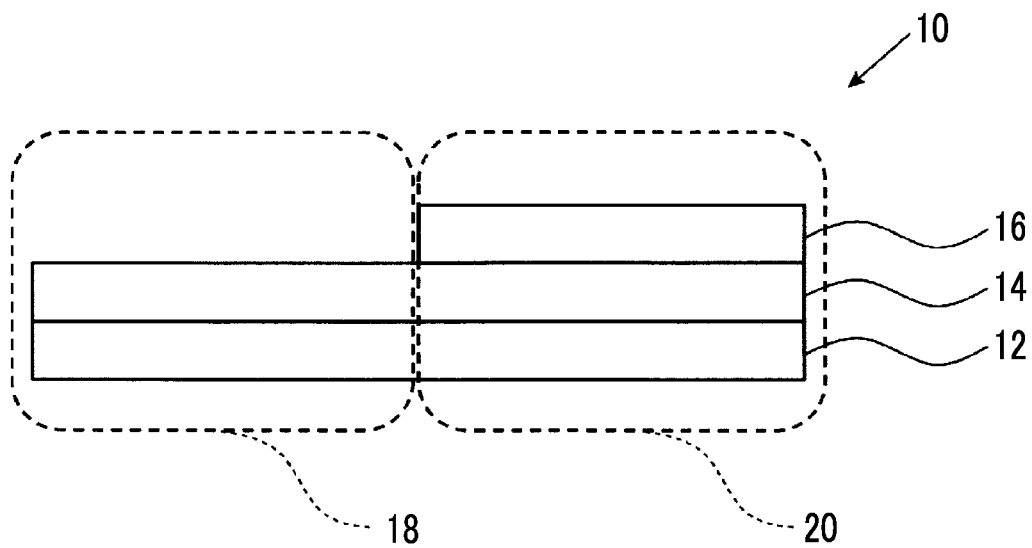
FIG. 1 is a schematic cross-sectional view showing an example of a first embodiment of the inspection tool.

Hereinafter, the present invention will be described in detail.

The description of the configuration requirements described below is made on the basis of representative embodiments of the present invention, but it should not be construed that the present invention is limited to those embodiments.

In the present specification, the numerical ranges shown using "to" indicate ranges including the numerical values described before and after "to" as the lower limit value and the upper limit value.

In addition, regarding numerical ranges that are described stepwise in the present specification, an upper limit value or a lower limit value described in a numerical range may be replaced with an upper limit value or a lower limit value of another stepwise numerical range. In addition, in the numerical range described in the present specification, an upper limit value and a lower limit value described in a certain numerical range may be replaced with values shown in Examples.

In addition, in the present specification, a solid content means a component forming a composition layer formed of a composition, and in a case where the composition contains a solvent (for example, organic solvent, water, and the like), the solid content means all components excluding the solvent. In addition, in a case where the components are components which form a composition layer, the components are considered to be solid contents even in a case where the components are liquid components.

In addition, in the present specification, ultraviolet rays mean light having a wavelength range of 10 to 400 nm.

In addition, in the present specification, (meth)acrylic means "at least one of acrylic or methacrylic".

In addition, in the present specification, "boiling point" means a boiling point at a standard atmospheric present.

In the present specification, the total light transmittance can be measured with a C light source using a haze meter (for example, NDH 2000 manufactured by Nippon Denshoku Industries Co., Ltd.).

The inspection tool according to the embodiment of the present invention is an inspection tool including a first display portion and a second display portion, in which the first display portion is a display portion which indicates a visual change before and after irradiation of the inspection tool with light having at least any of wavelengths in a wavelength range of 200 to 280 nm, and the second display portion is a display portion which does not indicate a visual change before and after irradiation of the inspection tool with light in a wavelength range of 200 to 230 nm, but indicates a visual change before and after irradiation of the inspection tool with light having at least any of wavelengths in a wavelength range of more than 230 nm and 280 nm or less.

It should be noted that the visual change before and after the irradiation with light described above means that the visual change occurs in a case of comparing before light irradiation (unirradiated state) and after light irradiation (irradiated state). However, the "after irradiation" is intended as a state in which the irradiation is performed from the unirradiated state, and is a concept including during irradiation. Therefore, the inspection tool according to the embodiment of the present invention may be an inspection tool in which the visual change occurs during irradiation with light.

In the inspection tool according to the embodiment of the present invention, since the first display portion is a display portion which indicates a visual change before and after irradiation of the inspection tool with light having at least any of wavelengths in a wavelength range of 200 to 280 nm, it is easy to inspect whether or not light which inactivates a virus or the like (corresponding to the light in a wavelength range of 200 to 280 nm) has been radiated. In addition, since the second display portion is a display portion which does not indicate a visual change before and after irradiation of the inspection tool with light in a wavelength range of 200 to 230 nm, but indicates a visual change before and after irradiation of the inspection tool with light having at least any of wavelengths in a wavelength range of more than 230 nm and 280 nm or less, it is easy to inspect whether or not whether or not light which is harmful to the human body has been radiated. For example, in a case where a lamp which emits light having a wavelength of 222 nm is deteriorated, harmful light having a wavelength of more than 230 nm and 280 nm or less may be emitted to the human body. In this case, by using the inspection tool according to the embodiment of the present invention, it can be easily inspected whether or not the light emitted from the used lamp has any influence on the human body.

Hereinafter, first, the above-described characteristics of the inspection tool will be described in detail.

The inspection tool according to the embodiment of the present invention includes the first display portion and the second display portion.

In the inspection tool according to the embodiment of the present invention, the first display portion and the second display portion may be provided on the same member or may be provided on separate members.

The visual change in the first display portion and the second display portion is not particularly limited as long as it is visually changed, and examples thereof include a color change, a pattern change, a brightness change, a lighting change, and a combination of these changes (for example, a combination of a color change and a pattern change).

Examples of the color change include a change in color tone and a change in color due to light emission, and specific examples thereof include a change from a light color to a dark color and a change from a dark color to a light color.

Examples of the pattern change include a change in figure, a change in picture, and a change in shape, and specific examples thereof include emerging letters from a plain background, emerging figures (illustration or graphs) from a plain background, changing of numbers, changing of letters, and changing of figures.

Examples of the brightness change include a change in emission brightness, and specific examples thereof include changing to be brighter and changing to be darker.

Examples of the lighting change include changes in lighting, blinking, and extinguishing of a light source, and specific examples thereof include a change in blinking pattern of the light source and a change in light source pattern in a light emitting diode (LED) array.

As will be described later, in a case where the first display portion and the second display portion are configured by a display, the above-described visual change is indicated by a display on the display, and in a case where the first display portion and the second display portion are configured by a photosensitive portion, it is sufficient that the photosensitive portion itself indicates the above-described visual change.

The visual change in the first display portion and the visual change in the second display portion may be the same or different from each other.

A form of the inspection tool is not particularly limited and may be a sheet-like shape, and various shapes such as a block shape, for example, a rectangular parallelepiped shape, a cylindrical shape, and the like can be used. Among these, a sheet-like inspection tool is suitably used.

In addition, as the shape of the sheet-like inspection tool, various shapes such as a square shape, a rectangular shape, a circular shape, an elliptical shape, a polygonal shape other than a quadrangular shape, for example, a hexagonal shape and the like, and an amorphous shape can be used.

In addition, the sheet-like inspection tool may include a long shape.

A lower limit value of a thickness of the inspection tool is preferably 5 µm or more, and more preferably 25 µm or more. In addition, an upper limit value of the thickness of the inspection tool is preferably 10 cm or less, and more preferably 2 cm or less.

[First Display Portion]

The first display portion is a display portion which indicates the visual change before and after irradiation of the inspection tool with light having at least any of wavelengths in a wavelength range of 200 to 280 nm.

A light source for radiating the light having at least any of wavelengths in a wavelength range of 200 to 280 nm is not particularly limited, but it is preferable to use, as the light source, a lamp having a maximum absorption wavelength of 207 nm or a maximum absorption wavelength of 222 nm, and it is more preferable to use, as the light source, a lamp having a maximum absorption wavelength of 222 nm. That is, it is preferable that the first display portion is a display portion which indicates a visual change before and after irradiation of the inspection tool with light using a lamp having a maximum absorption wavelength of 222 nm as a light source. Examples of the lamp having a maximum absorption wavelength of 222 nm include a KrCl excimer lamp, and examples of the lamp having a maximum absorption wavelength of 207 nm include a KrBr excimer lamp.

In that point, it is preferable that the first display portion indicates the visual change before and after irradiation such that an irradiation amount of the light having a wavelength of 222 nm is 0.1 mJ/cm$^2$ or more. The irradiation amount of the light having a wavelength of 222 nm, at which the visual change occurs in the first display portion, is preferably 0.1 to 10 mJ/cm$^2$, more preferably 0.1 to 6 mJ/cm$^2$, still more preferably 0.1 to 3 mJ/cm$^2$, and particularly preferably 0.1 to 1 mJ/cm$^2$. The sensitivity is better in a case where the visual change occurs with a smaller irradiation amount.

It is preferable that the first display portion indicates the visual change even before and after irradiation through a filter shielding light having a wavelength of more than 230 nm and 280 nm or less. The fact that the visual change occurs even before and after irradiation through a filter shielding light having a wavelength of more than 230 nm and 280 nm or less corresponds to a visual change even in a case of being irradiated with light which does not have a wavelength of 254 nm.

[Second Display Portion]

The second display portion is a display portion which does not indicate a visual change before and after irradiation of the inspection tool with light in a wavelength range of 200 to 230 nm, but indicates a visual change before and after irradiation of the inspection tool with light having at least any of wavelengths in a wavelength range of more than 230 nm and 280 nm or less.

A light source for radiating the light having at least any of wavelengths in a wavelength range of more than 230 nm and 280 nm or less is not particularly limited, but it is preferable to use, as the light source, a lamp having a maximum absorption wavelength of 254 nm. That is, it is preferable that the second display portion is a display portion which indicates a visual change before and after irradiation of the inspection tool with light using a lamp having a maximum absorption wavelength of 254 nm as a light source. Examples of the lamp having a maximum absorption wavelength of 254 nm include a low-pressure mercury lamp. In that point, it is preferable that the second display portion indicates the visual change before and after irradiation such that an irradiation amount of the light having a wavelength of 254 nm is 0.1 mJ/cm$^2$ or more. The irradiation amount of the light having a wavelength of 254 nm, at which the second display portion is visually changed, is preferably 0.1 to 10 mJ/cm$^2$, more preferably 0.1 to 6 mJ/cm$^2$, still more preferably 0.1 to 3 mJ/cm$^2$, and particularly preferably 0.1 to 1 mJ/cm$^2$. The sensitivity is better in a case where the visual change occurs with a smaller irradiation amount.

In the second display portion, the visual change does not occur before and after irradiation of the inspection tool with light in a wavelength range of 200 to 230 nm.

Examples of a unit for preventing the visual change before and after irradiation of the inspection tool with light in a wavelength range of 200 to 230 nm in the second display portion include a method of using a member which is not exposed to light before and after irradiation of the inspection tool with the light in a wavelength range of 200 to 230 nm and is exposed to light before and after irradiation of the inspection tool with the light having at least any of wavelengths in a wavelength range of more than 230 nm and 280 nm or less, and a method of using a filter (hereinafter, also referred to as a filter X) which shields the light in a wavelength range of 200 to 230 nm.

Hereinafter, the inspection tool will be described in detail with reference to specific aspects.

First Embodiment

According to a first embodiment of the inspection tool of the present invention, the first display portion includes a first photosensitive portion which indicates a visual change before and after being exposed to light having at least any of wavelengths in a wavelength range of 200 to 280 nm; and the second display portion includes a filter (filter X) which shields light having a wavelength of 200 to 230 nm, and a second photosensitive portion A which indicates a visual change before and after being exposed to light having at least any of wavelengths in a wavelength range of more than 230 nm and 280 nm or less, the light have passed through the filter X.

As will be described later, the first photosensitive portion and the second photosensitive portion A may be formed of the same member, or may be formed of different members.

It is preferable that the first display portion and the second display portion have supports for supporting the first display portion and the second display portion. The support included in the first display portion and the support included in the second display portion may be the same or different from each other.

A specific aspect of the above-described first embodiment is shown in FIG. 1. FIG. 1 is a schematic cross-sectional view showing an example of the first embodiment of the inspection tool. An inspection tool 10 shown in FIG. 1 includes a support 12, a photosensitive portion 14, and a filter 16 in this order. The filter 16 is disposed in a part of a region on a surface of the photosensitive portion 14 opposite to the support 12 side. That is, the filter 16 is disposed so as to cover a part of a region on the surface of the photosensitive portion 14.

In FIG. 1, the filter 16 is disposed so as to be in contact with the photosensitive portion 14, but the present invention is not limited to this aspect. Another layer (for example, a pressure-sensitive adhesive layer or an adhesive layer) is provided between the filter 16 and the photosensitive portion 14.

The photosensitive portion 14 is a photosensitive portion which is exposed to light having any wavelength of 200 to 280 nm and indicates the visual change before and after the exposure to light. In FIG. 1, an aspect in which the photosensitive portion 14 is exposed to all light in the wavelength range of 200 to 280 nm has been described, but the present invention is not limited to this aspect. As described above, the photosensitive portion 14 may be exposed to at least any of wavelengths in the wavelength range of 200 to 280 nm.

The filter 16 corresponds to the above-described filter X, and corresponds to a filter which shields the light having a wavelength of 200 to 230 nm. The filter 16 transmits at least a part of light in a wavelength range of 400 to 700 nm.

In the inspection tool 10, a portion surrounded by a broken line in which only the support 12 and the photosensitive portion 14 are laminated corresponds to a first display portion 18, and a portion surrounded by a broken line in which the support 12, the photosensitive portion 14, and the filter X are laminated corresponds to a second display portion 20.

In the following, a case where the inspection tool 10 shown in FIG. 1 is irradiated with light having a wavelength of 222 nm will be described.

Figure 2:
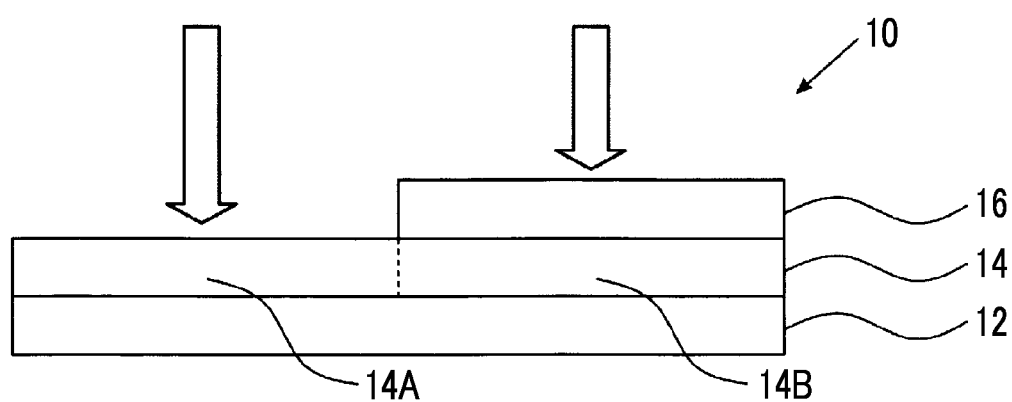
FIG. 2 is a view illustrating a case where the inspection tool is irradiated with light having a wavelength of 222 nm.

As shown by a white arrow in FIG. 2, the light having a wavelength of 222 nm is radiated to the inspection tool 10 from a side where the filter 16 is disposed. As shown in FIG. 2, in a photosensitive portion 14A of the inspection tool 10, which is not covered with the filter 16, is irradiated with the light having a wavelength of 222 nm, and the photosensitive portion 14 is exposed to light. On the other hand, as shown in FIG. 2, in a photosensitive portion 14B of the inspection tool 10, which is covered with the filter 16, since the light having a wavelength of 222 nm is shielded by the filter 16, and does not reach the photosensitive portion 14B, the photosensitive portion 14B is not exposed to light.

Here, it is assumed that the visual change from white to black occurs before and after the exposure of the photosensitive portion 14 with light in a wavelength range of 200 to 280 nm.

Figure 3:
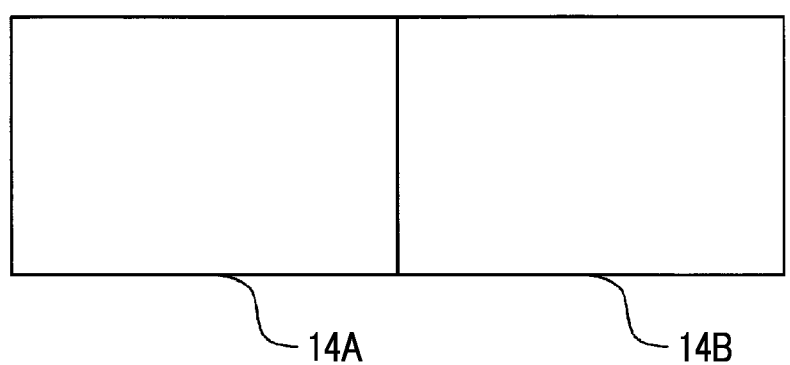
FIG. 3 is a plan view of the inspection tool before irradiation of the inspection tool with light having a wavelength of 222 nm.

In this case, first, in a case where the inspection tool 10 is visually recognized from a normal direction before the irradiation with light having a wavelength of 222 nm, as shown in FIG. 3, the photosensitive portion 14A and the photosensitive portion 14B in the photosensitive portion 14 included in the inspection tool 10 are both white. On the other hand, in a case where the inspection tool 10 is irradiated with the light having a wavelength of 222 nm as shown in FIG. 2, as shown in FIG. 4, the photosensitive portion 14A in the photosensitive portion 14 included in the inspection tool 10 is exposed to the light having a wavelength of 222 nm, and changes black; but the photosensitive portion 14B is not exposed to the light having a wavelength of 222 nm due to the filter 16, and remains white.

Figure 4:
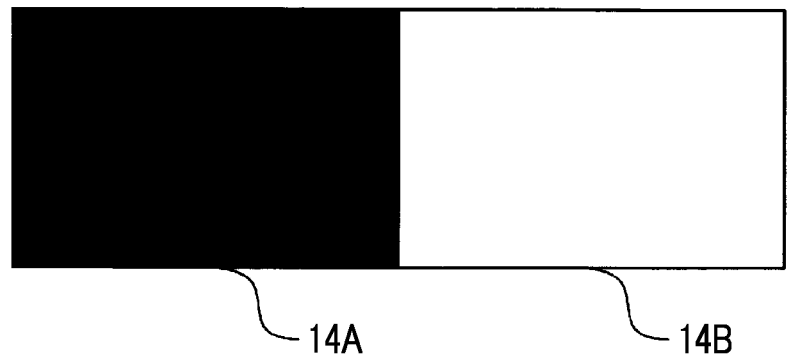
FIG. 4 is a plan view of the inspection tool after irradiation of the inspection tool with light having a wavelength of 222 nm.

Therefore, in a case where light radiated to the inspection tool 10 includes the light having a wavelength of 222 nm, which can contribute to the inactivation of a virus or the like, and does not include light in a wavelength range of more than 230 nm and 280 nm or less, which is harmful to the human body, since the inspection tool indicates the visual change as shown in FIG. 4, it is possible to easily inspect that the radiated light includes the light which can contribute to the inactivation of a virus or the like and does not include the light in a wavelength range of more than 230 nm and 280 nm or less, which is harmful to the human body.

Next, a case where the inspection tool 10 shown in FIG. 1 is irradiated with light including light having a wavelength of 222 nm and light having a wavelength of 254 nm will be described. Both of the light having a wavelength of 222 nm and the light having a wavelength of 254 nm is light having a wavelength which can contribute to the inactivation of a virus or the like, but the light having a wavelength of 254 nm corresponds to light having a wavelength harmful to the human body.

Figure 5:
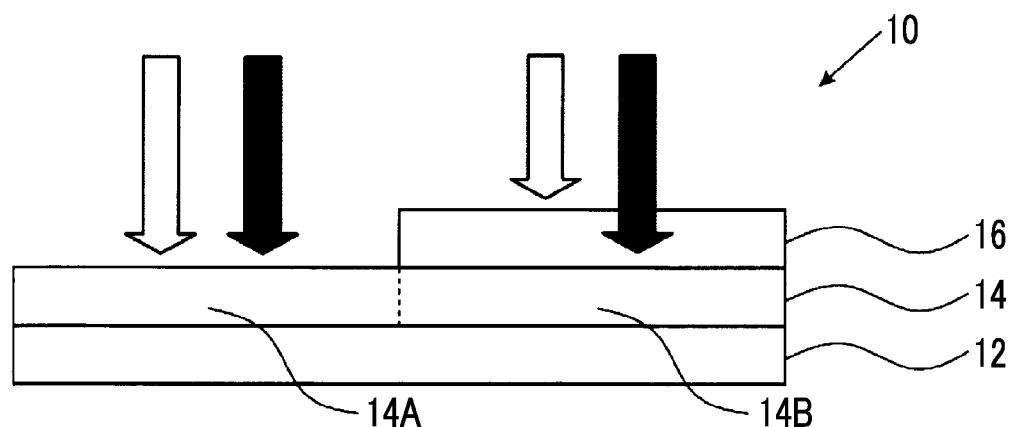
FIG. 5 is a view illustrating a case where the inspection tool is irradiated with light having a wavelength of 222 nm and light having a wavelength of 254 nm.

As shown in FIG. 5, the inspection tool 10 is irradiated with the light including the light having a wavelength of 222 nm and the light having a wavelength of 254 nm from a side where the filter 16 is disposed. In FIG. 5, a white arrow represents the irradiation of the light having a wavelength of 222 nm, and a black arrow represents the irradiation of the light having a wavelength of 254 nm. As shown in FIG. 5, in the photosensitive portion 14A of the inspection tool 10, which is not covered with the filter 16, is irradiated with both of the light having a wavelength of 222 nm and the light having a wavelength of 254 nm, and the photosensitive portion 14 is exposed to light. On the other hand, as shown in FIG. 5, in the photosensitive portion 14B of the inspection tool 10, which is covered with the filter 16, since the light having a wavelength of 222 nm is shielded by the filter 16 but the light having a wavelength of 254 nm passes through the filter 16, the photosensitive portion 14B is exposed to light.

Here, it is assumed that the visual change from white to black occurs before and after the exposure of the photosensitive portion 14 with light in a wavelength range of 200 to 280 nm.

Figure 6:
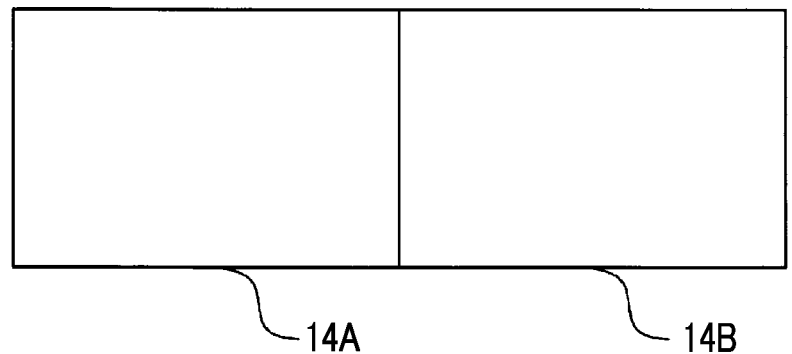
FIG. 6 is a plan view of the inspection tool before irradiation of the inspection tool with light having a wavelength of 222 nm and light having a wavelength of 254 nm.

In this case, first, before irradiating with the light including the light having a wavelength of 222 nm and the light having a wavelength of 254 nm, as shown in FIG. 6, the photosensitive portion 14A and the photosensitive portion 14B in the photosensitive portion 14 included in the inspection tool 10 are both white. On the other hand, after irradiating the inspection tool 10 with the light including both of the light having a wavelength of 222 nm and the light having a wavelength of 254 nm as shown in FIG. 5, as shown in FIG. 7, the photosensitive portion 14A in the photosensitive portion 14 included in the inspection tool 10 is exposed to both of the light having a wavelength of 222 nm and the light having a wavelength of 254 nm, and changes black; and the photosensitive portion 14B is also exposed to the light having a wavelength of 254 nm, and changes black.

Figure 7:
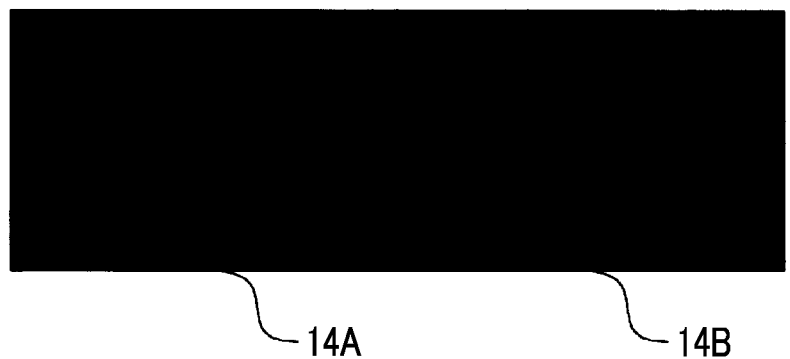
FIG. 7 is a plan view of the inspection tool after irradiation of the inspection tool with light having a wavelength of 222 nm and light having a wavelength of 254 nm.

Therefore, in a case where light radiated to the inspection tool 10 includes the light having a wavelength of 222 nm and the light having a wavelength of 254 nm, which can contribute to the inactivation of a virus or the like, and also includes the light having a wavelength of 254 nm, which is harmful to the human body, since the inspection tool indicates the visual change as shown in FIG. 7, it is possible to easily inspect that the radiated light includes the light which can contribute to the inactivation of a virus or the like and also includes the light having a wavelength of 254 nm or the like, which is harmful to the human body.

Figure 8:
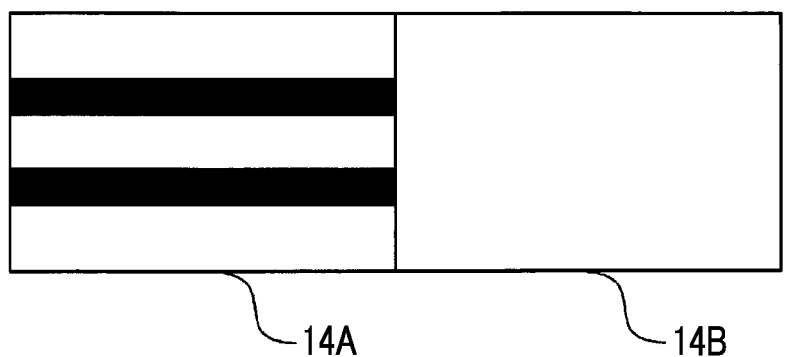
FIG. 8 is a view showing another aspect of the visual change of the inspection tool.
Figure 9:
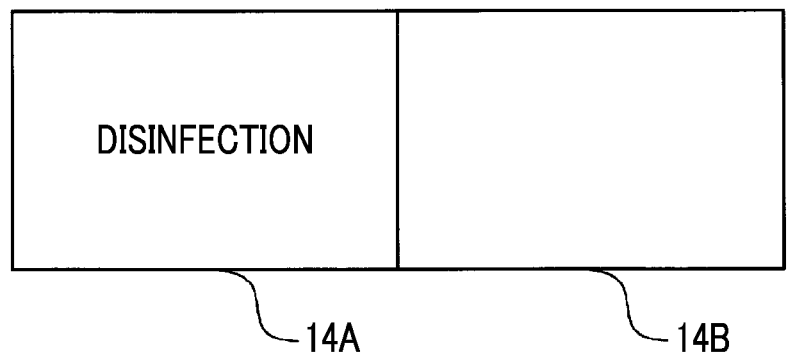
FIG. 9 is a view showing another aspect of the visual change of the inspection tool.

In FIG. 4 described above, the case where the photosensitive portion 14A is exposed to the light in a wavelength range of 200 to 280 nm and indicates the visual change from white to black has been described, but the present invention is not limited to this aspect. Any aspect may be used as long as it is an aspect in which the visual change occurs as described above. For example, as shown in FIG. 8, a pattern change may occurs such that a stripe pattern is generated in the photosensitive portion 14A, or as shown in FIG. 9, a pattern change may occurs such that a character "DISINFECTION" is generated in the photosensitive portion 14A. The above-described aspect is achieved by disposing a luminescent agent or a photoactivator, which will be described later, only in a portion where the change occurs.

Figure 10:
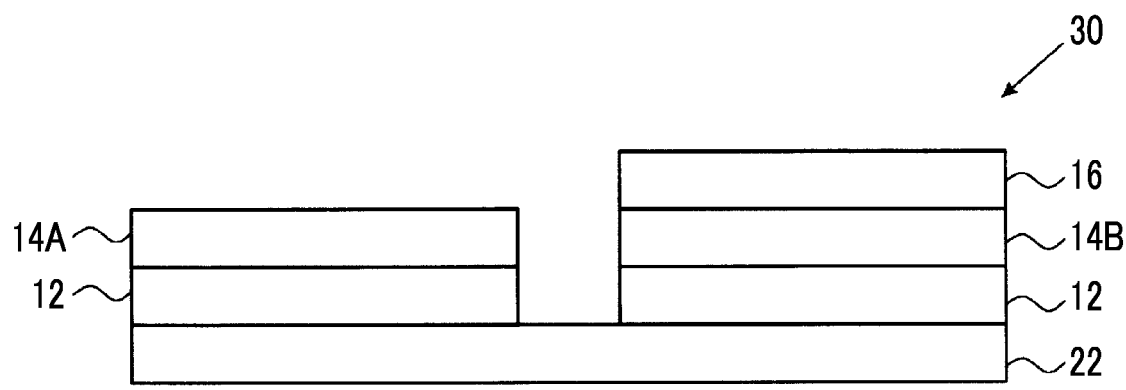
FIG. 10 is a view showing another aspect of the inspection tool.

In addition, in FIG. 1, the aspect of the structure in which the photosensitive portion 14A and the photosensitive portion 14B are connected has been described, but the present invention is not limited to this aspect. For example, as shown in FIG. 10, the photosensitive portion 14A and the photosensitive portion 14B may be prepared as separate members. In an inspection tool 30 shown in FIG. 10, a sheet including the support 12 and the photosensitive portion 14A and a sheet including the support 12, the photosensitive portion 14B, and the filter 16 are separately prepared, and these two sheets are arranged on a holding substrate 22.

Hereinafter each member of the first embodiment of the inspection tool will be described in detail.

Support

Examples of the support include a resin sheet, paper (including synthetic paper), cloth (including woven fabric and nonwoven fabric), glass, wood, and metal. As the support, a resin sheet or paper is preferable, a resin sheet or synthetic paper is more preferable, and a resin sheet is still more preferable.

Examples of a material of the resin sheet include a polyethylene-based resin, a polypropylene-based resin, a cyclic polyolefin-based resin, a polystyrene-based resin, an acrylonitrile-styrene copolymer, an acrylonitrile-butadiene-styrene copolymer, a polyvinyl chloride-based resin, a fluorine-based resin, a poly(meth)acrylic resin, a polycarbonate-based resin, a polyester-based resin (polyethylene terephthalate, polyethylene naphthalate, and the like), a polyamide-based resin such as various nylons, a polyimide-based resin, a polyamide-imide-based resin, a polyaryl phthalate-based resin, a silicone-based resin, a polysulfone-based resin, a polyphenylene sulfide-based resin, a polyethersulfone-based resin, a polyurethane-based resin, an acetal-based resin, and a cellulose-based resin. As the support, a resin which absorbs the light having a wavelength of 222 nm and transmits the light having a wavelength of 254 nm (for example, a triacetyl cellulose (TAC) sheet), which will be described later, is also preferable.

Examples of the synthetic paper include paper in which many microvoids are formed by biaxially stretching polypropylene or polyethylene terephthalate (YUPO and the like); paper produced from synthetic fibers such as polyethylene, polypropylene, polyethylene terephthalate, and polyamide; and paper in which these papers are laminated on part, one side, or both sides thereof.

In addition, examples of a suitable aspect of the resin sheet include a white resin sheet formed by dispersing a white pigment in a resin. Examples of a material of the resin in the above-described white resin sheet include the same materials as those in the resin sheet described above.

As the white resin sheet and the white pigment, a white resin film and a white pigment described in paragraph 0080 of WO2016/017701 can be referred to, the contents of which are incorporated in the present specification.

As the white resin sheet, for example, a white polyester sheet is preferable, and a white polyethylene terephthalate sheet is more preferable.

Examples of a commercially available product of the white resin sheet include YUPO (manufactured by YUPO Corporation), LUMIRROR (manufactured by Toray Industries Inc.), and CRISPER (manufactured by Toyobo Co., Ltd.).

A lower limit value of a thickness of the support is preferably 5 µm or more, more preferably 25 µm or more, and still more preferably 50 µm or more. In addition, the upper limit value thereof is preferably 1 cm or less, more preferably 2 mm or less, and still more preferably 500 µm or less.

First Photosensitive Portion

The first photosensitive portion indicates a visual change before and after exposure with light having at least any of wavelengths in a wavelength range of 200 to 280 nm (hereinafter, also referred to as specific ultraviolet rays X). It is preferable that the first photosensitive portion is exposed to light having a wavelength of at least 222 nm. The first photosensitive portion may be exposed to light having a plurality of wavelengths in a wavelength range of 200 to 280 nm, or may be exposed to light having all wavelengths in the wavelength range of 200 to 280 nm.

The first photosensitive portion preferably contains a color-forming agent, and from the viewpoint of further improving the sensitivity to light having a wavelength of 222 nm, it is more preferable to contain a color-forming agent and a photoactivator.

A main color-forming mechanism in a case where the photoactivator and the color-forming agent are contained is presumed as follows. The photoactivator absorbs the specific ultraviolet rays X and is activated to generate an acid and/or a radical, and the color-forming agent forms color by reaction with this acid and/or radical. In this case, an amount of acid and/or radical generated from the photoactivator varies depending on the irradiation amount of specific ultraviolet rays X, and an amount of the color-forming agent which forms color also varies depending on the amount of acid and/or radical generated from the photoactivator. As a result, in the irradiated region of the specific ultraviolet rays X in the first photosensitive portion, shade of the color optical density is generated according to the irradiation amount of the specific ultraviolet rays X, and the colored part is formed with the color optical density corresponding to the irradiation amount of the specific ultraviolet rays X.

Therefore, in a case where the first photosensitive portion is irradiated with the specific ultraviolet rays X, in a region irradiated with the specific ultraviolet rays X (ultraviolet-irradiated region), a colored part (color-formed image) is formed with the color optical density corresponding to the irradiation amount of the specific ultraviolet rays X (for example, integrated illuminance). The fact that color is formed with the color optical density corresponding to the irradiation amount of the specific ultraviolet rays X means that the color-formed image has gradation properties according to the irradiation amount of the specific ultraviolet rays X.

Color-Forming Agent

The color-forming agent refers to a compound which is colored or discolored by action of acid, oxidation, light irradiation, or the like. The term "color forming" described below is a concept including both coloration and discoloration. The coloration includes color forming from a state of being substantially colorless (a state in which it is colorless or exhibits a light color) by action of acid, oxidation, light irradiation, or the like. In addition, the discoloration includes a change in color from a specific colored state to another colored state (for example, a change from yellow color to red color) due to an influence of action of acid, oxidation, light irradiation, or the like.

The type of the color-forming agent is not particularly limited, and examples thereof include a color-forming agent which forms color by being oxidized, a color-forming agent which forms color by action of acid, and a color-forming agent which forms color by action of light. Among these, a color-forming agent which forms color by being oxidized or a color-forming agent which forms color by action of acid is preferable.

As the color-forming agent, a leuco coloring agent or a photochromic coloring agent is preferable, and a leuco coloring agent is more preferable.

The photochromic coloring agent is known as a compound which forms color by being isomerized by the action of light, a compound which absorbs light and emits light at a different wavelength (also referred to as a luminescent coloring agent), a compound which forms color by proceeding a ring-closing reaction by the action of light, a compound which forms color by proceeding a ring-opening reaction by the action of light, or the like, and a known photochromic coloring agent can be used. It is preferable that the photochromic coloring agent has a coloring-decolorizing reaction which reversibly proceeds with energy. Examples of the luminescent coloring agent include a coumarin derivative and a rodamine derivative such as Rodamine B.

The above-described leuco coloring agent is preferably a compound which forms color in a case of being oxidized from a substantially colorless state (hereinafter, also referred to as "oxidative color-forming leuco coloring agent") or a compound which forms color by the action of acid from a substantially colorless state (hereinafter, also referred to as "acid color-forming leuco coloring agent").

Examples of the leuco coloring agent include a triarylmethanephthalide-based compound, a fluoran-based compound, a phenothiazine-based compound, an indolylphthalide-based compound, an azaindolylphthalide-based compound, a leuco auramine-based compound, a rhodamine lactam-based compound, a triarylmethane-based compound, a diarylmethane-based compound, a triazene-based compound, a spiropyran-based compound, a thiazine-based compound, and a fluorene-based compound.

For details of the above-described compounds, reference can be made to the description of U.S. Pat. No. 3,445,234A, JP1993-257272A (JP-H5-257272A), and paragraphs 0029 to 0034 of WO2009/8248A.

The color-forming agent may be used alone or in combination of two or more kinds thereof.

Oxidative Color-Forming Leuco Coloring Agent

As one aspect of the oxidative color-forming leuco coloring agent, a compound having one or two hydrogen atoms, which forms color by removing electrons, is preferable. Examples of such an oxidative color-forming leuco coloring agent include (a) aminotriarylmethane, (b) aminoxanthine, (c) aminothioxanthine, (d) amino-9,10-dihydroacridine, (e) aminophenoxazine, (f) aminophenothiazine, (g) aminodihydrophenazine, (h) aminodiphenylmethane, (i) leuco indamine, (j) aminohydrocinnamic acid (cyanethane and leuco methine), (k) hydrazine, (l) leuco indigoid dye, (m) amino-2,3-dihydroanthraquinone, (n) tetrahalo-p,p'-biphenol, (o) 2-(p-hydroxyphenyl)-4,5-diphenylimidazole, and (p) phenethylaniline, which are described in U.S. Pat. No.

3,445,234A. Among the above-described (a) to (p), (a) to (i) form color by losing one hydrogen atom, and (j) to (p) form color by losing two hydrogen atoms.

Among these, aminoarylmethane is preferable, aminotriarylmethane is more preferable, and 4-dialkylaminotriarylmethane is still more preferable.

Specific examples of the oxidative color-forming leuco coloring agent include tris(4-dimethylaminophenyl)methane, tris(4-diethylaminophenyl)methane, bis(4-diethylaminophenyl)-(4-diethylamino-2-methylphenyl)methane, bis(4-diethylamino-2-methylphenyl)-(4-diethylaminophenyl)methane, bis(1-ethyl-2-methylindol-3-yl)-phenylmethane, 2-N-(3-trifluoromethylphenyl)-N-ethylamino-6-diethylamino-9-(2-methoxycarbonylphenyl)xanthene, 2-(2-chlorophenyl)amino-6-dibutylamino-9-(2-methoxycarbonylphenyl)xanthene, 2-dibenzylamino-6-diethylamino-9-(2-methoxycarbonylphenyl)xanthene, benzo[a]-6-N,N-diethylamino-9,2-methoxycarbonylphenylxanthene, 2-(2-chlorophenyl)-amino-6-dibutylamino-9-(2-methylphenylcarboxamidophenyl)xanthene, 3,6-dimethoxy-9-(2-methoxycarbonyl)-phenylxanthene, benzoyl leuco methylene blue, and 3,7-bis-diethylaminophenoxazine.

Acid Color-Forming Leuco Coloring Agent

As one aspect of the acid color-forming leuco coloring agent, a compound which forms color by donating electrons or receiving protons such as an acid is preferable. Specific examples thereof include a compound which has a partial skeleton such as lactone, lactam, sultone, spiropyrane, ester, and amide, in which these partial skeletons are ring-opened or cleaved upon contact with an acid or a proton.

Examples of the leuco coloring agent which forms color by the action of acid (acid color-forming leuco coloring agent) include 3,3-bis(2-methyl-1-octyl-3-indolyl)phthalide, 6'-(dibutylamino)-2'-bromo-3'-methylspiro[phthalido-3,9'-xanthene], 3-(4-diethylamino-2-ethoxyphenyl)-3-(1-ethyl-2-methylindol-3-yl)-4-azaphthalide, 3-(4-diethylamino-2-ethoxyphenyl)-3-(1-n-octyl-2-methylindol-3-yl)phthalide, 3-[2,2-bis(1-ethyl-2-methylindol-3-yl)vinyl]-3-(4-diethylaminophenyl)-phthalide, 2-anilino-6-dibutylamino-3-methylfluorane, 6-diethylamino-3-methyl-2-(2,6-xylidino)-fluorane, 2-(2-chloroanilino)-6-dibutylaminofluorane, 3,3-bis(4-dimethylaminophenyl)-6-dimethylaminophthalide, 2-anilino-6-diethylamino-3-methylfluorane, 9-[ethyl(3-methylbutyl)amino]spiro[12H-benzo[a]xanthene-12,1'(3'H)isobenzofuran]-3'-one, 2'-methyl-6'-(N-p-tolyl-N-ethylamino)spiro[isobenzofuran-1(3H),9'-[9H]xanthene]-3-one, 3',6'-bis(diethylamino)-2-(4-nitrophenyl)spiro[isoindole-1,9'-xanthene]-3-one, 9-(N-ethyl-N-isopentylamino)spiro[benzo[a]xanthene-12,3'-phthalide], 2'-anilino-6'-(N-ethyl-N-isopentylamino)-3'-methyl spiro[phthalide-3,9'-[9H]xanthene], and 6'-(diethylamino)-1',3'-dimethylfluorane.

From the viewpoint that the effect of the present invention is more excellent, the color-forming agent is preferably a compound having any of an indolylphthalide structure or an azaindolylphthalide structure, and more preferably a compound having an indolylphthalide structure.

The compound having an indolylphthalide structure is a compound having an indolylphthalide structure as a partial structure. As described above, the above-described compound having an indolylphthalide structure (indolylphthalide-based compound) and the above-described compound having an azaindolylphthalide structure (azaindolylphthalide-based compound) function as the color-forming agent. That is, the above-described compounds correspond to a color-forming agent having an indolylphthalide structure (particularly, an acid color forming agent) and a color-forming agent having an azaindolylphthalide structure.

The number of indolylphthalide structures in the compound having an indolylphthalide structure is not particularly limited, and may be 1 or a plural number. Among these, from the viewpoint that the effect of the present invention is more excellent, 2 or more is preferable, and 2 is more preferable.

As the compound having an indolylphthalide structure, a compound represented by General Formula (B) is preferable.

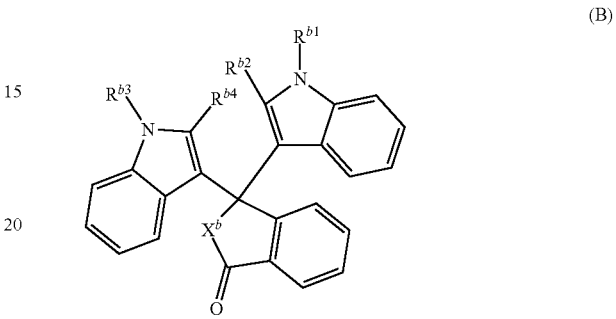

(B)

In General Formula (B), $R^{b1}$ to $R^{b4}$ each independently represent a hydrogen atom or an alkyl group which may have a substituent.

The number of carbon atoms in the alkyl group represented by $R^{b1}$ and $R^{b3}$ is not particularly limited, but from the viewpoint that the effect of the present invention is more excellent, 1 to 30 is preferable, 1 to 20 is more preferable, 1 to 12 is still more preferable, and 5 to 10 is particularly preferable.

The number of carbon atoms in the alkyl group represented by $R^{b2}$ and $R^{b4}$ is not particularly limited, but from the viewpoint that the effect of the present invention is more excellent, 1 to 10 is preferable, 1 to 5 is more preferable, and 1 to 3 is still more preferable.

Among these, from the viewpoint that the effect of the present invention is more excellent, $R^{b1}$ to $R^{b4}$ are preferably an alkyl group which may have a substituent, and more preferably an unsubstituted alkyl group.

$X^b$ represents —O— or —$NR^{b5}$—.

Among these, from the viewpoint that the effect of the present invention is more excellent, $X^b$ is preferably —O—.

$R^{b5}$ represents a hydrogen atom, an alkyl group which may have a substituent, or an aryl group which may have a substituent.

The number of carbon atoms in the alkyl group represented by $R^{b5}$ is not particularly limited, but from the viewpoint that the effect of the present invention is more excellent, 1 to 10 is preferable and 1 to 5 is more preferable.

The aryl group represented by $R^{b5}$ may have a monocyclic structure or a polycyclic structure.

A molecular weight of the compound represented by General Formula (B) is not particularly limited, but is preferably 300 or more and more preferably 500 or more. The upper limit thereof is not particularly limited, but is preferably 2,000 or less and more preferably 1,000 or less.

A content of the color-forming agent in the first photosensitive portion is not particularly limited, but from the viewpoint of excellent color-forming sensitivity at a wavelength of 222 nm, the content thereof per unit area (m²) of the ultraviolet-sensing layer 0.500 g/m 2 or less, 0.300 g/m 2 or less, still more preferably 0.140 g/m 2 or less, and particularly preferably 0.070 g/m 2 or less. The lower limit thereof is not particularly limited, but is preferably 0.020 g/m 2 or more and more preferably 0.030 g/m 2 or more. By setting the content of the color-forming agent in the first photosensitive portion within the above-described range, since excessive absorption of 222 nm by the color-forming agent is suppressed, the minimum amount of color-forming agent required for the color-forming reaction can be used, and as a result, it is presumed that the color-forming sensitivity at a wavelength of 222 nm is excellent.

The above-described content of the color-forming agent can be calculated by immersing the first photosensitive portion in methanol for 2 days and then analyzing the obtained solvent by liquid chromatography. The methanol is prevented from volatilizing during the immersion. In addition, as necessary, a calibration curve of the content of the color-forming agent to be detected may be created before the measurement of the liquid chromatography.

Measurement conditions of the liquid chromatography are as follows.

Equipment: Nexera manufactured by Shimadzu Corporation
Column: Capcell pak C18 UG-120
Eluent: water/methanol
Oven: 40° C.
Injection: 5 µL
Detection: maximum absorption wavelength of color-forming agent to be detected
Flow Rate: 0.2 mL/min Photoactivator The photoactivator is preferably a compound which is activated by light, and the photoactivator activated by light more preferably acts on the color-forming agent to form color. The photoactivator is preferably activated by light having at least any of wavelengths in a wavelength range of 200 to 280 nm, and more preferably activated by light having a wavelength of at least 222 nm. The photoactivator may be activated by light having a plurality of wavelengths in a wavelength range of 200 to 280 nm, or may be activated by light having all wavelengths in the wavelength range of 200 to 280 nm.

The photoactivator is preferably any one or more of a photooxidant or a photoacid generator. In a case where the first photosensitive portion contains the color-forming agent which forms color by being oxidized, the photoactivator preferably includes a photooxidant, and in a case where the first photosensitive portion contains the color-forming agent which forms color by action of acid, the photoactivator preferably includes a photoacid generator.

From the viewpoint that the effect of the present invention is more excellent, a mass ratio of a content of the photoactivator to a content of the color-forming agent (photoactivator/color-forming agent (mass ratio)) is preferably more than 1.00, more preferably 3.00 or more, still more preferably 8.00 or more, and particularly preferably 10.00 or more. The upper limit thereof is not particularly limited, but is preferably 40.00 or less, more preferably or less, still more preferably 25.00 or less, and particularly preferably 20.00 or less. By setting the mass ratio of the content of the photoactivator to the content of the color-forming agent, excessive absorption of light having a wavelength of 222 nm by the color-forming agent is suppressed, and the photoactivator efficiently absorbs the light having a wavelength of 222 nm, whereby it is considered that the color-forming reaction proceeds efficiently, and the color-forming sensitivity to light having a wavelength of 222 nm is excellent.

The above-described mass ratio of the content of the photoactivator to the content of the color-forming agent can be measured by liquid chromatography after methanol extraction in the same manner as the above-described content of the color-forming agent. The photoactivator is detected at the maximum absorption wavelength of the photoactivator to be detected, the color-forming agent is detected at the maximum absorption wavelength of the color-forming agent to be detected, and the mass ratio thereof is obtained.

Photooxidant

The photooxidant is preferably a compound which can cause the forming of the color-forming agent by being activated by ultraviolet rays to generate a radical and exhibit an action of extracting the hydrogen atom of the color-forming agent.

Among these, the photooxidant is preferably one or more of a radical generator and an organic halogen compound. It is also preferable to use the radical generator and the organic halogen compound in combination as the photoacid generator. In a case where the radical generator and the organic halogen compound are used in combination, from the viewpoint that the gradation properties of the colored part are more excellent, a content ratio (radical generator/organic halogen compound (mass ratio)) of the radical generator to the organic halogen compound is preferably 0.1 to 10 and more preferably 0.5 to 5.

Radical Generator

As the radical generator, a compound which is activated by ultraviolet rays to generate a radical is preferable, a compound which is activated by light having at least any of wavelengths in a wavelength range of 200 to 280 nm to generate a radical is more preferable, and a compound which is activated by light having a wavelength of at least 222 nm to generate a radical is still more preferable. The radical generator may be a compound which is activated by light having a plurality of wavelengths in a wavelength range of 200 to 280 nm to generate a radical, or may be a compound which is activated by light having all wavelengths in the wavelength range of 200 to 280 nm to generate a radical.

As the radical generator, a hydrogen-extracting radical generator is preferable. The hydrogen-extracting radical generator exhibits an action of extracting hydrogen atoms from the color-forming agent to promote the oxidation of the color-forming agent.

Examples of the radical generator include azide polymers described in The Lecture Summary, p. 55 for the Spring Meeting of the Society of Photographic Science and Technology of Japan, 1968; azide compounds described in U.S. Pat. No. 3,282,693A, such as 2-azidobenzoxazole, benzoylazide, and 2-azidobenzimidazole; compounds described in U.S. Pat. No. 3,615,568A, such as 3'-ethyl-1-methoxy-2-pyridothiacyanine perchlorate, 1-methoxy-2-methylpyridinium, and p-toluenesulfonate; lophine dimer compounds described in JP1987-039728B (JP-S62-039728B), such as a 2,4,5-triarylimidazole dimer; benzophenone; p-aminophenyl ketone; polynuclear quinone; and thioxanthene.

Among these, one or more selected from a lophine dimer and benzophenone is preferable, and a lophine dimer is more preferable.

Examples of the lophine dimer include a hexaarylbiimidazole compound. As the hexaarylbiimidazole-based compound, compounds described in paragraph 0047 of WO2016/017701A can be referred to, the contents of which are incorporated in the present specification.

Among these, 2,2'-bis(2-chlorophenyl)-4,4',5,5'-tetraphenyl-1,2'-biimidazole is preferable. As the 2,2'-bis(2-chlorophenyl)-4,4',5,5'-tetraphenyl-1,2'-biimidazole, for example, "B-IMD" (manufactured by KUROGANE KASEI Co., Ltd.) and "B-CIM" (manufactured by Hodogaya Chemical Co., Ltd.) can be used.

The radical generator may be used alone or in combination of two or more kinds thereof.

Organic Halogen Compound

The organic halogen compound can promote the oxidation of the color-forming agent.

From the viewpoint that the gradation properties of the colored part are more excellent, the organic halogen compound is preferably a compound in which the number of halogen atoms in the molecule is 3 or more. The upper limit value of the number of halogen atoms is preferably 9 or less. The organic halogen compound is a compound other than the lophine dimer and the benzophenone.

The organic halogen compound may be used alone or in combination of two or more kinds thereof.

Examples of the organic halogen compound include compounds represented by General Formulae (2) to (7).

$$P^0-CX_3 \quad (2)$$

In the formula, $P^0$ represents a hydrogen atom, a halogen atom, an alkyl group which may have a substituent, or an aryl group which may have a substituent. X's each independently represent a halogen atom.

Examples of the halogen atom represented by $P^0$ and X include a fluorine atom, a chlorine atom, a bromine atom, and an iodine atom, and a chlorine atom or a bromine atom is preferable.

Examples of the substituent which can be included in the alkyl group and aryl group represented by $P^0$ include a hydroxy group, a halogen atom, an alkyl group having 1 to 6 carbon atoms, a haloalkyl group having 1 to 6 carbon atoms, an acetyl group, and an alkoxy group having 1 to 6 carbon atoms.

Examples of the compound represented by General Formula (2) include trichloromethane, tribromomethane, carbon tetrachloride, carbon tetrabromide, p-nitrobenzotribromide, bromotrichloromethane, benzotrichloride, hexabromoethane, iodoform, 1,1,1-tribromo-2-methyl-2-propanol, 1,1,2,2-tetrabromoethane, 2,2,2-tribromoethanol, and 1,1,1-trichloro-2-methyl-2-propanol.

(3)

In the formula, R represents a substituent. x represents an integer of 0 to 5.

Examples of the substituent represented by R include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

In a case where a plurality of R's are present in the formula, the R's may be the same or different from each other.

x is preferably an integer of 0 to 3.

Examples of the compound represented by General Formula (3) include o-nitro-α,α,α-tribromoacetophenone, m-nitro-α,α,α-tribromoacetophenone, p-nitro-α,α,α-tribromoacetophenone, α,α,α-tribromoacetophenone, and α,α,α-tribromo-3,4-dichloroacetophenone.

$$R^1-SO_2-X^1 \quad (4)$$

In the formula, $R^1$ represents an alkyl group which may have a substituent or an aryl group which may have a substituent. $X^1$ represents a halogen atom.

As the alkyl group represented by $R^1$, an alkyl group having 1 to 20 carbon atoms is preferable, an alkyl group having 1 to 10 carbon atoms is more preferable, and an alkyl group having 1 to 6 carbon atoms is still more preferable.

As the aryl group represented by $R^1$, an aryl group having 6 to 20 carbon atoms is preferable, an aryl group having 6 to 14 carbon atoms is more preferable, and an aryl group having 6 to 10 carbon atoms is still more preferable.

Examples of the substituent which can be included in the alkyl group and aryl group represented by $R^1$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X_1$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (4) include 2,4-dinitrobenzenesulfonyl chloride, o-nitrobenzenesulfonyl chloride, m-nitrobenzenesulfonyl chloride, 3,3'-diphenylsulfonedisulfonyl chloride, ethanesulfonyl chloride, p-bromobenzenesulfonyl chloride, p-nitrobenzenesulfonyl chloride, p-3-benzenesulfonyl chloride, p-acetamidobenzenesulfonyl chloride, p-chlorobenzenesulfonyl chloride, p-toluenesulfonyl chloride, methanesulfonyl chloride, and benzenesulfonyl bromide.

$$R^2-S-X^2 \quad (5)$$

In the formula, $R^2$ represents an alkyl group which may have a substituent or an aryl group which may have a substituent. $X^2$ represents a halogen atom.

The alkyl group which may have a substituent and the aryl group which may have a substituent, represented by $R^2$, are the same as those of $R^1$ in General Formula (4), and suitable aspects thereof are also the same.

Examples of the halogen atom represented by $X^2$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (5) include 2,4-dinitrobenzenesulfenyl chloride and o-nitrobenzenesulfenyl chloride.

$$R^3\text{-}L^1\text{-}CX^3X^4X^5 \quad (6)$$

In the formula, $R^3$ represents an aryl group which may have a substituent or a heteroaryl group which may have a substituent. $L^1$ represents —SO— or —SO$_2$—. $X^3$, $X^4$, and $X^5$ each independently represent a hydrogen atom or a halogen atom. However, all of $X^3$, $X^4$, and $X^5$ are not hydrogen atoms at the same time.

As the aryl group represented by R³, an aryl group having 6 to 20 carbon atoms is preferable, an aryl group having 6 to 14 carbon atoms is more preferable, and an aryl group having 6 to 10 carbon atoms is still more preferable.

As the heteroaryl group represented by R³, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent which can be included in the aryl group and heteroaryl group represented by R 3 include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by X³, X⁴, and X⁵ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (6) include hexabromodimethyl sulfoxide, pentabromodimethyl sulfoxide, hexabromodimethylsulfone, trichloromethylphenylsulfone, tribromomethylphenylsulfone (BMPS), trichloro-p-chlorophenylsulfone, tribromomethyl-p-nitrophenylsulfone, 2-trichloromethylbenzothiazole-sulfone, 4,6-dimethylpyrimidine-2-tribromomethylsulfone, tetrabromodimethylsulfone, 2,4-dichlorophenyl-trichloromethylsulfone, 2-methyl-4-chlorophenyltrichloromethyl-sulfone, 2,5-dimethyl-4-chlorophenyltrichloromethyl-sulfone, 2,4-dichlorophenyltrimethylsulfone, and tri-p-tolylsulfonium trifluoromethanesulfonate. Among these, trichloromethylphenylsulfone or tribromomethylphenylsulfone (BMPS) is preferable.

$$R^4CX^6X^7X^8 \qquad (7)$$

In the formula, R⁴ represents a heteroaryl group which may have a substituent. X⁶, X⁷, and X⁸ each independently represent a hydrogen atom or a halogen atom. However, all of X⁶, X⁷, and X⁸ are not hydrogen atoms at the same time.

As the heteroaryl group represented by R⁴, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent which can be included in the heteroaryl group represented by R⁴ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by X⁶, X⁷, and X⁸ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (7) include tribromoquinaldine, 2-tribromomethyl-4-methylquinoline, 4-tribromomethylpyrimidine, 4-phenyl-6-tribromomethylpyrimidine, 2-trichloromethyl-6-nitrobenzothiazole, 1-phenyl-3-trichloromethylpyrazole, 2,5-ditribromomethyl-3,4-dibromothiophene, 2-trichloromethyl-3-(p-butoxystyryl)-1,3,4-oxadiazole, 2,6-ditrichloromethyl-4-(p-methoxyphenyl)-triazine, and 2-(4-methylphenyl)-4,6-bis(trichloromethyl)-1,3,5-triazine.

Among these, as the organic halogen compound, the compound represented by General Formula (3), the compound represented by General Formula (6), or the compound represented by General Formula (7) is preferable, and from the viewpoint of excellent sensitivity at a wavelength of 222 nm, the compound represented by General Formula (6) is more preferable. The reason why the sensitivity at a wavelength of 222 nm is excellent is not clear, but it is presumed that the above-described compound represented by General Formula (6) has good compatibility with the wavelength of 222 nm.

As the halogen atom included in the above-described compound, a chlorine atom, a bromine atom, or an iodine atom is preferable, and a chlorine atom or a bromine atom is more preferable.

Photoacid Generator

The photoacid generator is preferably a compound which is cleaved by ultraviolet rays to generate an acid and can cause the forming of the color-forming agent by action of the generated acid. The photoacid generator is more preferably a compound which generates an acid by light having at least any of wavelengths in a wavelength range of 200 to 280 nm and can cause the forming of the color-forming agent by action of the generated acid, and still more preferably a compound which generates an acid by light having a wavelength of at least 222 nm and can cause the forming of the color-forming agent by action of the generated acid.

The photoacid generator may be a compound which is cleaved by light having a plurality of wavelengths in a wavelength range of 200 to 280 nm to generate an acid, or may be a compound which is cleaved by light having all wavelengths in the wavelength range of 200 to 280 nm to generate an acid.

Examples of the photoacid generator include a non-ionic photoacid generator and an ionic photoacid generator, and from the viewpoint that the effect of the present invention is more excellent, a non-ionic photoacid generator is preferable. Examples of the non-ionic photoacid generator include an organic halogen compound and an oxime compound, and among these, from the viewpoint that the effect of the present invention is more excellent, an organic halogen compound is preferable, and the compound represented by General Formula (6) described above is more preferable.

From the viewpoint that the gradation properties of the colored part are more excellent, the organic halogen compound is preferably a compound in which the number of halogen atoms in the molecule is 3 or more. The upper limit value of the number of halogen atoms is preferably 9 or less.

The organic halogen compound may be used alone or in combination of two or more kinds thereof.

Specific examples of the organic halogen compound include the same organic halogen compounds as those mentioned as the photooxidant in the upper part.

Examples of the ionic photoacid generator include a diazonium salt, an iodonium salt, and a sulfonium salt, and an iodonium salt or a sulfonium salt is preferable. Examples of the ionic photoacid generator include compounds described in JP1987-161860A (JP-S62-161860A), JP1986-067034A (JP-S61-067034A), and JP1987-050382A (JP-S62-050382A), the contents of which are incorporated in the present specification.

In addition, the photoacid generator is not particularly limited as long as it is a compound which generates an acid by light, and the photoacid generator may be a photoacid generator which generates an inorganic acid such as a hydrogen halide (for example, hydrochloric acid), a sulfuric acid, and a nitric acid, or may be a photoacid generator which generates an organic acid such as a carboxylic acid and a sulfonic acid. From the viewpoint that the effect of the present invention is more excellent, a photoacid generator which generates an inorganic acid is preferable, and a photoacid generator which generates a hydrogen halide is more preferable.

Specific examples of the photoacid generator include triarylsulfonium hexafluorophosphate, triarylsulfonium arsenate and triarylsulfonium antimonate, diaryliodonium hexafluorophosphate, diaryliodonium arsenate and diaryliodonium antimonate, dialkylphenacylsulfonium tetrafluoroborate and dialkylphenacylsulfonium hexafluorophosphate, dialkyl-4-hydroxyphenylsulfonium tetrafluoroborate and dialkyl-4-hydroxyphenylsulfonium hexafluorophosphate, N-bromosuccinimide, tribromomethylphenylsulfone, diphenyliodine, 2-trichloromethyl-5-(p-butoxystyryl)-1,3,4-oxadiazole, and 2,6-ditrichloromethyl-4-(p-methoxyphenyl)-triazine.

The photoacid generator may be used alone or in combination of two or more kinds thereof.

Light Stabilizer

The first photosensitive portion preferably contains a light stabilizer.

The light stabilizer is not particularly limited as long as it is a material which stabilizes with light, but it is preferably a light stabilizer which acts as a so-called free-radical scavenger, trapping free radicals of the activated photoactivator.

The light stabilizer may be used alone or in combination of two or more kinds thereof.

Examples of the light stabilizer include polyhydric phenols such as 2,5-bis(1,1,3,3-tetramethylbutyl)hydroquinone, hydroquinone, catechol, resorcinol, and hydroxyhydroquinone; aminophenols such as o-aminophenol and p-aminephenol.

A content ratio of the light stabilizer to the photoactivator (light stabilizer/photoactivator (molar ratio)) is preferably 0.0001 to 10 and more preferably 0.0002 to 5.

Ultraviolet Absorber

The first photosensitive portion may contain an ultraviolet absorber.

The ultraviolet absorber may be used alone or in combination of two or more kinds thereof.

From the viewpoint of more excellent sensitivity at a wavelength of 222 nm, preferred examples of the ultraviolet absorber include a triazine compound and a benzodithiol compound.

Examples of a commercially available triazine compound include ADK STAB LA-F70 (manufactured by ADEKA Corporation); Tinuvin 1577 ED and Tinuvin 1600 (manufactured by BASF); 2,4-Bis(2,4-dimethylphenyl)-6-(2-hydroxy-4-n-octyloxyphenyl)-1,3,5-triazine, 2-(2,4-Dihydroxyphenyl)-4,6-diphenyl-1,3,5-triazine, and Ethylhexyl Triazone (manufactured by TOKYO CHEMICAL INDUSTRY CO., LTD.).

Examples of the benzodithiol compound include compounds described in WO2019/159570A.

Binder

The first photosensitive portion preferably contains a binder.

It is preferable that the binder includes either a water-soluble binder or a water-insoluble binder.

Examples of the binder include cellulose resins such as methylcellulose, ethylcellulose, carboxymethylcellulose, and hydroxypropylcellulose, polyvinyl alcohol, gum arabic, gelatin, polyvinylpyrrolidone, casein, styrene-butadiene copolymer, acrylonitrile-butadiene copolymer, polyvinyl acetate, acrylic resin, polyvinyl chloride, and ethylene-vinyl acetate copolymer. From the viewpoint of excellent sensitivity at a wavelength of 222 nm, as the binder, a binder having substantially no aromatic group is preferable, and a cellulose resin or an acrylic resin is more preferable.

In addition, as the binder, polymer binders described in paragraph 0078 of JP2017-167155A can be referred to, the contents of which are incorporated in the present specification.

The binder may be used alone or in combination of two or more kinds thereof.

The binder may be crosslinked. In other words, the binder may be a crosslinked binder.

A crosslinking agent is not particularly limited, and for example, glyoxazole can be used. In addition, a crosslinking agent described in paragraph 0079 of JP2017-167155A can also be referred to. The contents thereof are incorporated in the present specification.

Microcapsules

The first photosensitive portion preferably contains a microcapsule.

The microcapsule usually includes a core portion and a capsule wall for encompassing a core material (encompassed substance (hereinafter, also referred to as an encompassed component)) forming the core portion.

In a case where the first photosensitive portion contains the microcapsule, as the core material (encompassed component), the microcapsule preferably contains a color-forming agent and a solvent, more preferably contains a color-forming agent, a photoactivator, and a solvent, and still more preferably contains a color-forming agent, a photoactivator, a light stabilizer, and a solvent. Examples of the color-forming agent, the photoactivator, and the light stabilizer include the color-forming agent, the photoactivator, and the light stabilizer described above, and preferred aspects thereof are also the same.

The solvent contained in the microcapsule is not particularly limited as long as it is in a liquid state at 25° C., but the solvent preferably includes one or more solvents having a boiling point of 100° C. or higher. The upper limit of the boiling point of the solvent is, for example, 500° C. or lower. In the presence of the solvent in the microcapsule, since the color-forming agent is present in the liquid phase of the solvent, action of the photoactivator on the color-forming agent is favorable.

The solvent contained in the microcapsule may be used alone or in combination of two or more kinds thereof.

Examples of a preferred aspect of the microcapsule include a microcapsule containing a photooxidant as the photoactivator and containing, as the color-forming agent, a color-forming agent which forms color by being oxidized.

In addition, examples of another preferred aspect of the microcapsule include a microcapsule containing a photoacid generator as the photoactivator and containing, as the color-forming agent, a color-forming agent which forms color by action of acid.

It is preferable that the microcapsule prevents contact between substances inside and outside the capsule by a substance-separating action of the capsule wall at normal temperature. Specific examples thereof include JP1984-190886A (JP-S59-190886A) and JP1985-242094A (JP-S60-242094A), the contents of which are incorporated in the present specification.

It is preferable that the capsule wall of the microcapsule is substantially composed of a resin. The term "substantially composed of a resin" means that a content of the resin with respect to the total mass of the capsule wall is 90% by mass or more, preferably 100% by mass. That is, it is preferable that the capsule wall of the microcapsule is composed of a resin.

Examples of the above-described resin include polyurethane, polyurea, polyester, polycarbonate, a urea-formaldehyde resin, a melamine-formaldehyde resin, polystyrene, a styrene-methacrylate copolymer, gelatin, polyvinylpyrrolidone, and polyvinyl alcohol. Among these, from the viewpoint that the sensitivity at the wavelength of 222 nm can be further improved by forming a dense crosslinking structure which prevents encompassed substances from leaking and by controlling the transmittance at the wavelength of 222 nm, one or more selected from the group consisting of polyurea, polyurethane urea, and polyurethane are more preferable.

The polyurea is a polymer having a plurality of urea bonds, and is preferably a reaction product formed from a raw material containing polyamine and polyisocyanate.

It is also possible to synthesize the polyurea using the polyisocyanate without using the polyamine, by utilizing the fact that a part of the polyisocyanate reacts with water to form the polyamine.

In addition, the polyurethane urea is a polymer having a urethane bond and a urea bond, and is preferably a reaction product formed from a raw material containing polyol, polyamine, and polyisocyanate.

In a case where the polyol is reacted with the polyisocyanate, a part of the polyisocyanate reacts with water to form the polyamine, and as a result, the polyurethane urea is obtained.

In addition, the polyurethane is a polymer having a plurality of urethane bonds, and is preferably a reaction product formed from a raw material containing polyol and polyisocyanate.

An average particle diameter of the microcapsule is preferably 0.1 to 100 µm in terms of volume average particle diameter.

The average particle diameter (volume average particle diameter) of the microcapsule can be measured by, for example, a laser analysis and scattering-type particle size distribution analyzer LA950 (manufactured by HORIBA, Ltd.).

In addition, in a case where an average particle diameter of the microcapsule contained in the first photosensitive portion is measured, the average particle diameter (volume average particle diameter) of the microcapsule can be measured with a scanning electron microscope (SEM). Specifically, a surface of the first photosensitive portion is observed with the SEM at a magnification of 5,000, and the average particle diameter of all microcapsules present in the observed visual field is obtained image analysis. In a case where the microcapsule cannot be observed on the surface, a cross-sectional piece is produced and measured in the same manner as described above.

The average particle diameter (volume average particle diameter) of the microcapsule can be controlled by adjusting production conditions of the microcapsule.

Other Components

In addition to the above-described components, the first photosensitive portion may contain, as necessary, additives such as a wavelength conversion coloring agent, a fluorescent dye, a surfactant, a wax, a reducing agent, a sensitizer, a crosslinking agent, and an odor suppressant.

As the reducing agent, the sensitizer, and the surfactant, description in lower left column of page 9 to upper left column of page 10 in JP1989-207741A (JP-H1-207741A), in paragraphs 0072 to 0075 of WO2016/017701A, and in paragraphs 0038, 0039, and 0048 to 0059 of JP2004-233614A can be referred to, the contents of which are incorporated in the present specification.

The type of the surfactant is not particularly limited, and a known surfactant can be used. From the viewpoint of excellent coating surface, the surfactant is preferably an anionic or non-ionic surfactant, and examples thereof include alkylbenzenesulfonates (such as sodium dodecylbenzenesulfonate and ammonium dodecylbenzenesulfonate), alkylsulfonates (such as sodium lauryl sulfate and dioctyl sodium sulfosuccinate), polyalkylene glycols (such as polyoxyethylene nonylphenyl ether).

A mass (coating amount of solid content) per unit area of the first photosensitive portion is not particularly limited, but for example, is preferably 0.1 to 30 $g/m^2$, more preferably 0.5 to 25 $g/m^2$, and still more preferably 1 to 10 $g/m^2$.

A thickness of the first photosensitive portion is preferably 0.1 to 30 µm, more preferably 0.5 to 25 µm, and still more preferably 1 to 10 µm.

A method of forming the first photosensitive portion is not particularly limited, and examples thereof include a known method.

Examples thereof include a method of applying a composition for forming a photosensitive portion, which contains a microcapsule containing a color-forming agent, onto a support, a method of applying a composition for forming a photosensitive portion, containing a color-forming agent onto a support, and a method of printing a composition for forming a photosensitive portion, containing a color-forming agent, to a support. In a case where the first photosensitive portion has a filter described later, the composition for forming a photosensitive portion may be applied onto the filter. The support may be changed to a temporary support, and the temporary support may be peeled off after the first photosensitive portion is formed.

The composition for forming a photosensitive portion may contain other components which may be contained in the first photosensitive portion described above.

A method of applying the composition for forming a photosensitive portion is not particularly limited, and examples of a coater used for the application include an air knife coater, a rod coater, a bar coater, a curtain coater, a gravure coater, an extrusion coater, a die coater, a slide bead coater, and a blade coater.

A method of printing the composition for forming a photosensitive portion is not particularly limited, and examples thereof include screen printing and inkjet printing.

After applying the composition for forming a photosensitive portion, the coating film may be subjected to a drying treatment as necessary. Examples of the drying treatment include a heating treatment.

Other Layers

The first display portion may have a layer other than the support and the first photosensitive portion described above.

Examples of other layers include a reflective layer, a glossy layer, a filter, and a sensitivity-adjusting layer.

As the reflective layer, the adhesive layer, the glossy layer, the sensitivity-adjusting layer, and methods for manufacturing these layers, reflective layers, adhesive layers, glossy layers, sensitivity-adjusting layers, and methods for manufacturing these layers described in paragraphs 0082 to 0109 of WO2016/017701A can be referred to. The contents thereof are incorporated in the present specification.

As the filter, a filter (hereinafter, also referred to as a filter Y) which shields light having a wavelength of more than 280 nm is preferable. By shielding the light having a wavelength of more than 280 nm, deterioration of the first photosensitive portion due to UV-A and UV-B can be suppressed.

In the filter Y, an average transmittance at a wavelength of more than 280 nm and 400 nm or less is preferably 0% to 30%, more preferably 0% to 20%, and still more preferably 0% to 10%.

The filter Y may be colored, but from the viewpoint that the first display portion can be visually recognized through the filter, it is preferable that the filter is transparent, and the total light transmittance of the filter Y is preferably 70% to 100%, more preferably 80% to 100%, and still more preferably 90% to 100%.

A visible light transmittance (an average transmittance in a visible light region (400 to 700 nm)) of the filter Y is preferably 70% to 100%, more preferably 80% to 100%, and still more preferably 90% to 100%.

In a case where the first display portion is irradiated with light having a wavelength range of 200 to 280 nm through the filter Y for inspection, it is preferable that the filter Y transmits light having a wavelength range of 200 to 280 nm. An average transmittance at a wavelength of 200 to 280 nm is preferably 70% to 100%, more preferably 80% to 100%, and still more preferably 90% to 100%.

As the filter Y, an ultraviolet band pass filter, a filter containing a dielectric, a sheet containing an ultraviolet absorber, or the like is used.

As the ultraviolet absorber, a known ultraviolet absorber can be used. In addition, from the viewpoint of shielding the light having a wavelength of more than 280 nm, it is preferable to contain an ultraviolet absorber which may be contained in the first photosensitive portion.

Spectral characteristics (for example, various transmittances such as visible light transmittance described above) of the filter Y can be measured, for example, using an ultraviolet-visible spectrophotometer (UV-2700/Shimadzu Corporation).

Examples of a method of forming the filter Y include a method of attaching a sheet which shields the light having a wavelength of more than 280 nm, and a method of applying a composition for forming a filter, which contains a compound shielding the light having a wavelength of more than 280 nm, onto the first photosensitive portion.

<<Second Photosensitive Portion A>>>

The second photosensitive portion A indicates a visual change before and after being exposed to light having at least any of wavelengths in a wavelength range of more than 230 nm and 280 nm or less (hereinafter, also referred to as "specific ultraviolet rays Y"), the light have passed through the filter X. The second photosensitive portion A may be exposed to light having a plurality of wavelengths in a wavelength range of more than 230 nm and 280 nm or less, or may be exposed to light having all wavelengths in the wavelength range of more than 230 nm and 280 nm or less. It is preferable that the second photosensitive portion A indicates the visual change before and after being exposed to light having a wavelength of at least 254 nm.

As will be described later, since the second photosensitive portion A is irradiated with the light through the filter X, the second photosensitive portion A may be exposed to light having at least any of wavelengths in a wavelength range of 200 to 230 nm.

Same as the first photosensitive portion, the second photosensitive portion A preferably contains a color-forming agent, and more preferably contains a color-forming agent and a photoactivator.

Examples of the color-forming agent which may be contained in the second photosensitive portion A include the color-forming agent which may be contained in the first photosensitive portion.

Examples of the photoactivator (specifically, a photooxidant and a photoacid generator) which may be contained in the second photosensitive portion A include the photoactivator which may be contained in the first photosensitive portion, except that the photosensitive wavelength is the above-described specific ultraviolet rays Y. More specifically, the photoactivator which may be contained in the second photosensitive portion A is preferably activated by light having at least any of wavelengths in a wavelength range of more than 230 nm and 280 nm or less. The photoactivator which may be contained in the second photosensitive portion A may be activated by light having a plurality of wavelengths in a wavelength range of more than 230 nm and 280 nm or less, or the photoactivator may be activated by light having all wavelengths in the wavelength range of more than 230 nm and 280 nm or less. It is preferable that the photoactivator which may be contained in the second photosensitive portion A is activated by light having a wavelength of at least 254 nm.

The second photosensitive portion A may contain the light stabilizer, the ultraviolet absorber, the binder, the microcapsule, and other components, which may be contained in the first photosensitive portion.

Examples of a method of forming the second photosensitive portion A include the same method as the method of forming the first photosensitive portion described above.

As described above, the first photosensitive portion is a member which is exposed to light having at least any of wavelengths in a wavelength range of 200 to 280 nm and indicates the visual change, but in a case where the first photosensitive portion is also exposed to the specific ultraviolet rays Y and indicates the visual change, the first photosensitive portion and the second photosensitive portion A may be the same member. For example, in a case where the first photosensitive portion is exposed to light having all wavelengths in a wavelength range of 200 to 280 nm, since the first photosensitive portion is exposed to the specific ultraviolet rays Y, the first photosensitive portion can be used as the second photosensitive portion.

In other words, in a case where the second photosensitive portion A is exposed to the specific ultraviolet rays Y, the second photosensitive portion A may indicate a visual change before and after being exposed to light having at least any of wavelengths in a wavelength range of 200 to 230 nm. Therefore, the photoactivator which may be contained in the second photosensitive portion A may be activated by the light having at least any of wavelengths in a wavelength range of 200 to 230 nm and the light having at least any of wavelengths in a wavelength range of more than 230 nm and 280 nm or less. Specifically, the photoactivator which may be contained in the second photosensitive portion A may be a photoactivator which is activated by light having all wavelengths in a wavelength range of 200 to 280 nm.

<<Filter which Shields Light Having Wavelength of 200 to 230 nm (Filter X)>>

The filter X is a filter which shields light having a wavelength of 200 to 230 nm. An average transmittance of the filter X at a wavelength of 200 to 230 nm is preferably 50% or less, more preferably 30% or less, still more preferably 10% or less, and particularly preferably 1% or less. The lower limit of the above-described average transmittance of the filter X at a wavelength of 200 to 230 nm is not particularly limited, and examples thereof include 0%.

It is preferable that the filter X shields light having a wavelength of 222 nm, and a transmittance of the filter X at a wavelength of 222 nm is preferably 10% or less, more preferably 5% or less, and still more preferably 1% or less. The lower limit of the transmittance of the filter X at a wavelength of 222 nm is not particularly limited, and examples thereof include 0%.

It is preferable that the filter X shields light having a wavelength of 230 nm, and a transmittance of the filter X at a wavelength of 230 nm is preferably 50% or less, more preferably 40% or less, still more preferably 25% or less, and particularly preferably 15% or less. The lower limit of the transmittance of the filter X at a wavelength of 230 nm is not particularly limited, and examples thereof include 0%. In many cases, as the transmittance at a wavelength of 230 nm is lower, light shielding properties to light in a wavelength range of 200 to 230 nm is better.

In the filter X, from the viewpoint that the effects of the present invention are more excellent, it is preferable that the average transmittance at a wavelength of 200 to 230 nm is within the above-described range and the transmittance at a wavelength of 222 nm is within the above-described range.

The filter X is preferably a filter which transmits light having a wavelength of more than 230 nm and 280 nm or less. Specifically, an average transmittance of the filter X at a wavelength of 230 to 280 nm is preferably 50% to 100%, more preferably 60% to 100%, still more preferably 70% to 100%, particularly preferably 80% to 100%, and most preferably 90% to 100%.

It is preferable that the filter X transmits light having a wavelength of 254 nm, and a transmittance of the filter X at a wavelength of 254 nm is preferably 50% or more, more preferably 70% or more, and still more preferably 75% or more. The upper limit of the transmittance of the filter X at a wavelength of 254 nm is not particularly limited, and examples thereof include 100%.

As the transmittance at a wavelength of 254 nm is higher, the sensitivity is better.

In the filter X, from the viewpoint that both light shielding properties at a wavelength of 200 to 230 nm and transmittance at a wavelength of more than 230 nm and 280 nm or less are satisfied, a difference between the transmittance at a wavelength of 222 nm and the transmittance at a wavelength of 254 nm is preferably 50% to 100%, more preferably 65% to 100%, and still more preferably 75% to 100%.

In the filter X, from the viewpoint that the light shielding properties at a wavelength of 200 to 230 nm and the transmittance at a wavelength of more than 230 nm and 280 nm or less are more excellent, a difference between the transmittance at a wavelength of 230 nm and the transmittance at a wavelength of 254 nm is preferably 40% to 100%, more preferably 50% to 100%, and still more preferably 70% to 100%.

The filter X may be colored, but from the viewpoint of visibility, the filter X is preferably transparent. The total light transmittance of the filter X is preferably 70% to 100%, more preferably 80% to 100%, and still more preferably 90% to 100%.

A visible light transmittance of the filter X is preferably 70% to 100%, more preferably 80% to 100%, and still more preferably 90% to 100%.

Examples of a preferred aspect of the filter X include a sheet which absorbs light having a wavelength of 222 nm and transmits light having a wavelength of 254 nm.

Specifically, a sheet having substantially no aromatic group is preferable, and examples thereof include a triacetyl cellulose (TAC) sheet, a polyvinyl chloride (PVC) sheet, a (meth)acrylic sheet, a polyurethane sheet, and a polyurea sheet. That is, the filter X preferably contains a resin selected from the group consisting of triacetyl cellulose, polyvinyl chloride, an acrylic resin, a methacrylic resin, polyurethane, and polyurea.

The "triacetyl cellulose (TAC)" in the present embodiment means a cellulose acylate in which a hydroxyl group of cellulose, that is, a hydrogen atom constituting a free hydroxyl group at 2-, 3-, and 6-positions of β-1,4-bonded glucose units is substituted with an acetyl group, and a degree of substitution of acetyl group is 2.3 or more. The degree of substitution of acetyl group is preferably 2.7 or more.

Here, the "degree of substitution" refers to a degree of substitution of acetyl group with a hydrogen atom constituting the hydroxyl group of cellulose, and can be calculated by comparing carbon area intensity ratios of cellulose acylate measured by $^{13}$C-NMR method.

Examples of the TAC sheet include FUJITAC Z-TAC (manufactured by FUJIFILM Corporation).

Examples of another preferred aspect of the filter X include an aspect of containing a compound which shields light having a wavelength of 200 to 230 nm (hereinafter, also referred to as a compound X). The compound X is preferably a compound which absorbs light having a wavelength of 222 nm and transmits light having a wavelength of 254 nm.

The compound X may be a low-molecular-weight compound, a high-molecular-weight compound, or a crosslinked product.

Examples of the compound X include a compound having a carbonyl bond, and it is preferable that the compound X has any one partial structure selected from the group consisting of an ester bond, a urethane bond, and a urea bond. Specific examples thereof include triacetyl cellulose (TAC) resins; cellulose derivatives such as acetyl cellulose, alkyl cellulose, carboxymethyl cellulose, and hydroxyalkyl cellulose; polyvinyl alcohol derivatives such as polyvinyl acetate, polyvinyl butyral, and polyvinylpyrrolidone; (meth)acrylic resins; urethane resins; and urea resins. Examples of the urethane resin and the urea resin include a resin reacted with xylene diisocyanate. A content of the compound X in the filter X is preferably 50% to 100% by mass, and more preferably 80% to 100% by mass with respect to the total mass of the filter X.

Preferred examples of the compound X include known ultraviolet absorbers. Examples of the ultraviolet absorber include a triazine compound, a benzotriazole compound, a benzophenone compound, and a benzodithiol compound. Among these, as the compound X, a triazine compound or a benzodithiol compound is preferable. Specific examples of the triazine compound and the benzodithiol compound include the same compounds as the ultraviolet absorber which may be contained in the first photosensitive portion.

Spectral characteristics (for example, various transmittances such as visible light transmittance described above)

of the filter X can be measured, for example, using an ultraviolet-visible spectrophotometer (UV-2700/Shimadzu Corporation).

A thickness of the filter X is appropriately selected in consideration of the transmittance at a wavelength of 222 nm and the transmittance at a wavelength of 254 nm, and is preferably 500 nm or more, more preferably 1 µm or more, and still more preferably 2 µm or more. In a case where the transmittance at a wavelength of 254 nm is sufficient, as the thickness of the filter X is higher, the light having a wavelength of 222 nm can be shielded. On the other hand, in a case where the transmittance at a wavelength of 254 nm is low, as the thickness of the filter X is lower, the light having a wavelength of 254 nm can be shielded. The upper limit of the thickness of the filter X is not particularly limited and is preferably 2 cm or less, but from the viewpoint of the light shielding properties at a wavelength of 222 nm and the transmittance at a wavelength of 254 nm, it is more preferably 1000 µm or less, still more preferably 500 µm or less, and particularly preferably 200 µm or less.

Examples of a method of forming the second display portion including the second photosensitive portion A and the filter X include a method of attaching a sheet which shields light having a wavelength of 200 to 230 nm to the second photosensitive portion A, a method of applying a composition for forming a filter, containing the compound X, onto the second photosensitive portion A to form a filter, and a method of applying a composition for forming the second photosensitive portion A onto a sheet which shields light having a wavelength of 200 to 230 nm.

Second Embodiment

According to a second embodiment of the inspection tool of the present invention, the first display portion includes a first photosensitive portion which indicates a visual change before and after being exposed to light having at least any of wavelengths in a wavelength range of 200 to 280 nm; and the second display portion includes a second photosensitive portion B which is not exposed to light in a wavelength range of 200 to 230 nm and indicates a visual change before and after being exposed to the light having at least any of wavelengths in a wavelength range of more than 230 nm and 280 nm or less.

Figure 11:
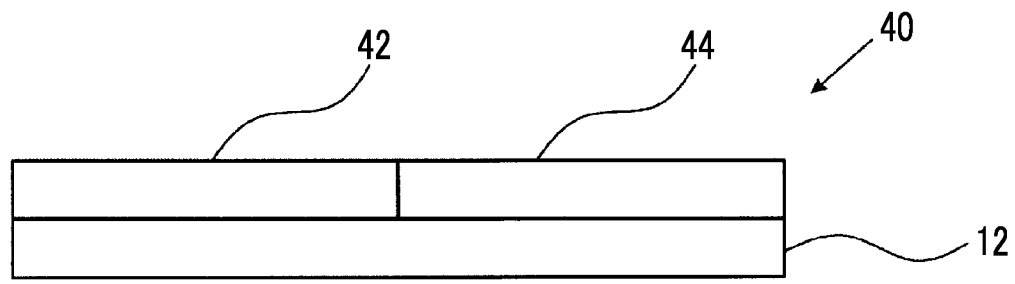
FIG. 11 is a schematic cross-sectional view showing an example of a second embodiment of the inspection tool.

A specific aspect of the above-described second embodiment is shown in FIG. 11. FIG. 11 is a schematic cross-sectional view showing an example of the second embodiment of the inspection tool. An inspection tool 40 shown in FIG. 11 includes a support 12, a first photosensitive portion 42, and a second photosensitive portion B 44.

First Photosensitive Portion

The first photosensitive portion according to the second embodiment has the same configuration as the first photosensitive portion according to the first embodiment, and a preferred aspect thereof is also the same.

Second Photosensitive Portion B

The second photosensitive portion B is not exposed to light in a wavelength range of 200 to 230 nm, and indicates a visual change before and after being exposed to the light having at least any of wavelengths in a wavelength range of more than 230 nm and 280 nm or less.

Since the second photosensitive portion B is a photosensitive portion which is not exposed to the light in a wavelength range of 200 to 230 nm, it is preferable that the second photosensitive portion B contains a compound which shields light having a wavelength of 200 to 230 nm (compound X), and further contains a color-forming agent and a photoactivator activated by at least the specific ultraviolet rays Y, same as the above-described second photosensitive portion A. Same as the photoactivator which can be contained in the second photosensitive portion A described above, the photoactivator contained in the second photosensitive portion B may be exposed to light having at least any of wavelengths in a wavelength range of 200 to 230 nm. That is, a material which can be contained in the second photosensitive portion B is the same as the material which can be contained in the second photosensitive portion A, except for the compound X, so that descriptions of materials other than the compound X will be omitted.

In order to obtain a photosensitive portion which is not exposed to the light in a wavelength range of 200 to 230 nm, it is also preferable to select a color-forming agent and a photoactivator in accordance with the wavelength.

(Compound which Shields Light Having Wavelength of 200 to 230 nm (Compound X)

The compound X is the same as the compound X which may be contained in the filter X according to the first embodiment, and a preferred aspect thereof is also the same.

It is preferable that the compound X in the second photosensitive portion B exists as a capsule wall of microcapsule in addition to existing as a binder or an additive. The microcapsule which can be contained in the second photosensitive portion B has the same configuration as the microcapsule which can be contained in the first photosensitive portion according to the first embodiment, and a preferred aspect thereof is also the same.

That is, it is preferable that the second photosensitive portion B contains the microcapsule which has the compound X as a capsule wall and contains, as a core material, the microcapsule containing a color-forming agent and a solvent.

As the microcapsule contained in the second photosensitive portion B, a microcapsule having a reactant of xylene diisocyanate as the capsule wall and containing a color-forming agent and the like is preferable.

In a case where the compound X is used as the capsule wall, from the viewpoint of light shielding properties, a thickness (number average wall thickness) of the capsule wall of the microcapsule is preferably 0.2 to 5 µm and more preferably 0.3 to 2 µm.

The thickness of the microcapsules refers to the thickness of a capsule wall forming the capsule particles of the microcapsules. The number-average wall thickness refers to a value obtained by measuring the thickness of the capsule wall of 10 microcapsules by using a scanning electron microscope (SEM) and calculating the average thereof. More specifically, a cross-sectional specimen of the second photosensitive portion B containing the microcapsule is prepared, and a cross-section thereof is observed with an SEM at 1,000 times. After selecting 5 microcapsules in descending order of average particle diameter (volume average particle diameter), the cross section of each selected microcapsule is observed at a magnification of to obtain the thickness of the capsule wall of the microcapsule, and the average value is calculated.

Examples of a method of forming the second photosensitive portion B include a method of applying a composition containing the compound X, the color-forming agent, and the like onto a support, a method of applying a composition which contains a compound X precursor having an isocyanate group, the color-forming agent, and the like onto a support, and then reacting isocyanate by heating to form a film, and a method of applying a composition containing a microcapsule which contains the compound X, the color-forming agent, and the like onto a support.

Third Embodiment

According to a third embodiment of the inspection tool of the present invention, the invention tool includes a first light-receiving portion which receives light having at least any of wavelengths in a wavelength range of 200 to 280 nm; a first display portion which indicates a visual change according to a light-receiving amount of the first light-receiving portion; the filter X; a second light-receiving portion which receives light having at least any of wavelengths in a wavelength range of more than 230 nm and 280 nm or less; and a second display portion which indicates a visual change according to a light-receiving amount of the second light-receiving portion. The filter X is provided on the light-receiving surface side of the second light-receiving portion.

For example, in a case where the above-described inspection tool according to the third embodiment is irradiated with light having a wavelength of 222 nm, the irradiated light is received by the first light-receiving portion, and the visual change occurs in the first display portion according to the light-receiving amount thereof. On the other hand, since the filter X is disposed on the light-receiving surface side of the second light-receiving portion, in a case where light having a wavelength of 222 nm is radiated to the second light-receiving portion, the light having a wavelength of 222 nm is absorbed by the filter X and the second light-receiving portion cannot receive the light having a wavelength of 222 nm, no visual change occurs in the second display portion. Based on the above-described results, in a case where light radiated to the inspection tool according to the third embodiment includes the light having a wavelength of 222 nm, which can contribute to the inactivation of a virus or the like, and does not include light having a wavelength of more than 230 nm and 280 nm or less, which is harmful to the human body, the visual change occurs only in the first display portion, and the irradiated light includes the light having a wavelength which can contribute to the inactivation of a virus or the like (here, the light at 222 nm), so that it can be inspected that light harmful to the human body is not included.

The first light-receiving portion and the second light-receiving portion may be the same or different from each other.

The first display portion and the second display portion may be the same or different from each other.

In the above-described third embodiment, the types of the first display portion and the second display portion are not particularly limited as long as the visual change occurs, but for example, the first display portion and the second display portion may be configured of a light source array, and are preferably configured of an LED array. The light source array is an array in which a plurality of light sources are arranged at a predetermined distance, and more specifically, an array in which a plurality of LED light sources are arranged at a predetermined distance is preferable. In a case where the first display portion and the second display portion are configured of the LED array as described above, by changing the number of LED light sources to be lit in the LED array according to the light-receiving amounts of the first light-receiving portion and the second light-receiving portion, the visual change occurs. The relationship between the number of LED light sources to be lit and the light-receiving amounts is determined based on a predetermined relationship.

In addition, the first display portion and the second display portion may have aspects other than the light source array as described above, and may be configured of, for example, a display. Characters and numbers can be displayed on the display according to the light-receiving amount. The relationship between the light-receiving amount and the characters to be displayed is determined based on a predetermined relationship.

In the above-described third embodiment, the first light-receiving portion receives light having at least any of wavelengths in a wavelength range of 200 to 280 nm. It is preferable that the first light-receiving portion receives light having a wavelength of at least 222 nm. The first light-receiving portion may receive light having a plurality of wavelengths in a wavelength range of 200 to 280 nm, or may receive light having all wavelengths in the wavelength range of 200 to 280 nm.

In the above-described third embodiment, the second light-receiving portion receives light having at least any of wavelengths in a wavelength range of more than 230 nm and 280 nm or less. It is preferable that the second light-receiving portion receives light having a wavelength of at least 254 nm. The second light-receiving portion may receive light having a plurality of wavelengths in a wavelength range of more than 230 nm and 280 nm or less, or may receive light having all wavelengths in the wavelength range of more than 230 nm and 280 nm or less.

Since the second light-receiving portion is irradiated with the light through the filter X, the second light-receiving portion may receive light having at least any of wavelengths in a wavelength range of 200 to 230 nm.

Specific configurations of the first light-receiving portion and the second light-receiving portion are not particularly limited, and examples thereof include a photodiode. The photodiode detects the light-receiving amount.

The inspection tool according to the third embodiment may further contain a controller, and the controller causes the first display portion to visually change according to the light-receiving amount of the first light-receiving portion. In addition, the controller causes the second display portion to visually change according to the light-receiving amount of the second light-receiving portion.

In the inspection tool according to the embodiment of the present invention, the first display portion and the second display portion may be structurally connected or may be composed of separate members. For example, as described in the first embodiment above, in a case where a part of a range of a photosensitive sheet which is exposed to light having all wavelengths in the wavelength range of 200 to 280 nm and indicates a visual change is used as the first photosensitive portion and the other range is used as the second photosensitive portion A, the first display portion and the second display portion are structurally connected. In addition, for example, in the case of the above-described third embodiment, an aspect of including a first unit including the first light-receiving portion and the first display portion and a second unit including the second light-receiving portion and the second display portion, which is not structurally connected to the first unit, may be used.

Inspection Kit

An inspection kit includes at least the above-described inspection tool.

A specific configuration of the inspection kit is not particularly limited, and examples thereof include an aspect of including the inspection tool and other elements selected from the group consisting of a light-shielding filter (for example, a filter which shields indoor light such as fluorescent lamp and LED, and sunlight), a light-shielding bag (bag which shields indoor light and sunlight), a judgment sample, a limit sample (calibration sheet), and a condensing jig such as a lens and a concave mirror.

It is preferable that the light-shielding filter has the same aspect as the filter Y described above.

The present invention also relates to the inspection method using the inspection tool according to the embodiment of the present invention. In the inspection method according to the embodiment of the present invention, by using the above-described inspection tool, inspecting whether or not light which inactivates a virus or the like has been radiated and inspecting whether or not light which is harmful to the human body has been radiated can be performed.

EXAMPLES

Hereinafter, the features of the present invention will be more specifically described using Examples and Comparative Examples. The materials, the amounts of materials used, the proportions, the treatment details, the treatment procedure, and the like shown in Examples below may be modified as appropriate as long as the modifications do not depart from the spirit of the present invention. Accordingly, the scope of the present invention should not be construed as being limited by the specific examples given below.

Example 1

A mixed solution 1 having the following composition was added to a 5% by mass aqueous solution (202 parts by mass) of polyvinyl alcohol, and then emulsified and dispersed at to obtain an emulsified liquid having a volume average particle diameter of 1 μm. Further, the obtained emulsified liquid was continuously stirred at 50° C. for 4 hours. Further, water was added thereto to adjust the concentration of solid contents, thereby obtaining a 15.9% by mass microcapsule dispersion liquid containing a color-forming agent.

Composition of Mixed Solution 1

Color-forming agent: 3,3-bis(2-methyl-1-octyl-3-indolyl) phthalide (manufactured by BASF) 0.7 parts by mass
Organic halogen compound: tribromomethylphenylsulfone (manufactured by SUMITOMO SEIKA CHEMICALS CO., LTD.) 10 parts by mass
Solvent: tricresyl phosphate (manufactured by DAI-HACHI CHEMICAL INDUSTRY CO., LTD.) 23 parts by mass
Solvent for producing capsule: ethyl acetate (manufactured by SHOWA DENKO K.K.) parts by mass
Light stabilizer: 2,5-bis(1,1,3,3-tetramethylbutyl)hydroquinone (manufactured by TOKYO CHEMICAL INDUSTRY CO., LTD.) 0.03 parts by mass
Material for forming capsule wall: adduct of xylylene diisocyanate and trimethylolpropane (product name "TAK-ENATE D-110N", manufactured by Mitsui Chemicals, Inc., 75% by weight ethyl acetate solution) 31 parts by mass The obtained microcapsule dispersion (20 parts by mass), a 6% by mass aqueous solution of polyvinyl alcohol (product name "Denka Size EP-130", manufactured by Denka Company Limited.) (5 parts by mass), glyoxal (manufactured by Daito Chemical Co., Ltd.) (0.05 parts by mass), and a 50% by mass aqueous solution of sodium dodecylbenzenesulfonate (manufactured by DKS Co., Ltd.) (0.09 parts by mass) were mixed with each other to produce a composition for forming a photosensitive portion.

The obtained composition for forming a photosensitive portion was applied onto a white polyethylene terephthalate sheet (product name "CRISPER K1212", manufactured by Toyobo Co., Ltd.) having a thickness of 188 μm such that an applied amount of solid contents was 3 g/m$^2$, and then heated and dried to produce a sheet 1A including the support and the photosensitive portion. A film thickness of the photosensitive portion was approximately 3 μm. The photosensitive portion indicated a visual change before and after being exposed to light having any wavelength of 200 to 280 nm.

The photosensitive portion in the sheet 1A corresponds to the first photosensitive portion of the inspection tool according to the first embodiment described above.

The above-described sheet 1A was separately prepared, and a TAC sheet (FUJITAC Z-TAC, manufactured by FUJIFILM Corporation, thickness: 60 μm, transmittance at a wavelength of 222 nm: 0.1%, transmittance at a wavelength of 230 nm: 3.2%, transmittance at a wavelength of 254 nm: 79.9%, average transmittance at a wavelength of 200 to 230 nm: 0.3%, average transmittance at a wavelength of 230 to 280 nm: 66.0%, visible light transmittance: 92%) was laminated on a surface side of the photosensitive portion in the obtained sheet 1A opposite to the support to produce a sheet 1B.

The TAC sheet in the sheet 1B corresponds to the filter X of the inspection tool according to the first embodiment described above, and the photosensitive portion in the sheet 1B corresponds to the second photosensitive portion A of the inspection tool according to the first embodiment described above.

The sheet 1A and the sheet 1B were set on one holding jig made of white resin to produce an inspection tool 1. The holding jig had two opening portions, and it was set that light hit the first photosensitive portion in the sheet 1A and light hit the second photosensitive portion A in the sheet 1B. That is, the sheet 1A and the sheet 1B were set on the holding jig so that the surface opposite to the support was the light-receiving surface. The inspection tool 1 corresponds to the first embodiment, and the first photosensitive portion and the second photosensitive portion A contained microcapsules.

In Example 1, the sheet 1A and the sheet 1B were housed in one holding jig, but they may be used as separate sheets.

Example 2

A sheet 2B was produced in place of the sheet 1B in the same manner as in Example 1, except that the mixed solution 1 was changed to a mixed solution 2.

The sheet 1A produced in Example 1 and the sheet 2B were set in one holding jig, and an inspection tool 2 was produced and evaluated in the same manner as in Example 1. The inspection tool 2 corresponds to the first embodiment, and the first photosensitive portion and the second photosensitive portion contained microcapsules.

The second photosensitive portion in the sheet 2B indicated a visual change before and after being exposed to light having any wavelength of 240 to 280 nm.

Composition of Mixed Solution 2

Color-forming agent: LEUCO CRYSTAL VIOLET (product name "LCV", manufactured by Yamada Chemical Co., Ltd.) 2.6 parts by mass Organic halogen compound: tribromomethylphenylsulfone (manufactured by SUMITOMO SEIKA CHEMICALS CO., LTD.) 1.3 parts by mass Radical generator: lophine dimer (2,2'-bis(2-chlorophenyl)-4,4',5,5'-tetraphenyl-1,2'-biimidazole, product name "B-IMD", manufactured by KUROGANE KASEI Co., Ltd.) 2.5 parts by mass Solvent: tricresyl phosphate (manufactured by DAI-HACHI CHEMICAL INDUSTRY CO., LTD.) 23 parts by mass Solvent: SAS-296 (phenylxylylethane, product name "Nisseki Hisol SAS296", manufactured by JX Nippon Oil and Energy Corp) 8 parts by mass Solvent for producing capsule: ethyl acetate (manufactured by SHOWA DENKO K.K.) 50 parts by mass Light stabilizer: 2,5-bis(1,1,3,3-tetramethylbutyl)hydroquinone (manufactured by TOKYO CHEMICAL INDUSTRY CO., LTD.) 0.3 parts by mass Material for forming capsule wall: adduct of xylylene diisocyanate and trimethylolpropane (product name "TAKENATE D-110N", manufactured by Mitsui Chemicals, Inc., 75% by weight ethyl acetate solution) 31 parts by mass Example 3

A mixed solution 3 having the following composition was applied onto a white polyethylene terephthalate sheet (product name "CRISPER K1212", manufactured by Toyobo Co., Ltd.) having a thickness of 188 μm such that an applied amount of solid contents was 10 g/m$^2$, and then dried to produce a sheet 3A including the support and the photosensitive portion. A film thickness of the photosensitive portion was approximately 10 μm.

The photosensitive portion in the sheet 3A corresponds to the first photosensitive portion of the inspection tool according to the first embodiment described above. The photosensitive portion in the sheet 3A indicated a visual change before and after being exposed to light having any wavelength of 200 to 280 nm.

Composition of Mixed Solution 3

Color-forming agent: 3,3-bis(2-methyl-1-octyl-3-indolyl) phthalide (manufactured by BASF) 0.65 parts by mass Organic halogen compound: tribromomethylphenylsulfone (manufactured by SUMITOMO SEIKA CHEMICALS CO., LTD.) 0.6 parts by mass Binder: acrylic acid/ethyl acrylate/ethyl methacrylate copolymer 13 parts by mass Light stabilizer: 2,5-bis(1,1,3,3-tetramethylbutyl)hydroquinone (manufactured by TOKYO CHEMICAL INDUSTRY CO., LTD.) 0.03 parts by mass Solvent: tricresyl phosphate (manufactured by DAI-HACHI CHEMICAL INDUSTRY CO., LTD.) 1 part by mass Solvent: methyl ethyl ketone (manufactured by Sankyo Chemical Co., Ltd.) 26 parts by mass The above-described sheet 3A was separately prepared, and a TAC sheet (FUJITAC Z-TAC, thickness: 60 μm, manufactured by FUJIFILM Corporation) was laminated on a surface side of the photosensitive portion in the obtained sheet 3A opposite to the support to produce a sheet 3B.

The TAC sheet in the sheet 3B corresponds to the filter X of the inspection tool according to the first embodiment described above, and the photosensitive portion in the sheet 3B corresponds to the second photosensitive portion A of the inspection tool according to the first embodiment described above.

The sheet 3A and the sheet 3B were set in one holding jig, and an inspection tool 3 was produced and evaluated in the same manner as in Example 1. The inspection tool 3 corresponds to the first embodiment, and the first photosensitive portion and the second photosensitive portion did not contain microcapsules.

Example 4

A sheet 4 was produced in the same manner as the sheet 1A in Example 1, except that the support was changed to a TAC sheet (FUJITAC Z-TAC, thickness: 60 μm, manufactured by FUJIFILM Corporation) having a thickness of 60 μm. The sheet 4 was set on a holding jig made of white resin so that the surface coated with the photosensitive portion was the light-receiving surface. The sheet is referred to as a sheet 4A.

The photosensitive portion in the sheet 4A corresponds to the first photosensitive portion of the inspection tool according to the first embodiment described above.

In addition, in the same manner, the sheet 4 was set on the holding jig made of white resin so that the TAC sheet surface of the sheet 4 was the light-receiving surface. The sheet is referred to as a sheet 4B.

The TAC sheet disposed on the light-receiving surface side of the sheet 4B corresponds to the filter X of the inspection tool according to the first embodiment described above, and the photosensitive portion in the sheet 4B corresponds to the second photosensitive portion A of the inspection tool according to the first embodiment described above.

A sample in which the sheet 4A and the 4B were set was used as an inspection tool 4, and evaluation was performed in the same manner as in Example 1. The inspection tool 4 corresponds the first embodiment, and the first photosensitive portion and the second photosensitive portion contained microcapsules.

Example 5 parts by mass of ethyl acetate and 10 parts by mass of TAKENATE D-110N (adduct of xylylene diisocyanate and trimethylolpropane, manufactured by Mitsui Chemicals, Inc., 75% by weight ethyl acetate solution) were mixed, and the mixture was spin-coated onto a silicon wafer at 1,500 rpm for 15 seconds. The obtained coating film was immersed in hot water at for 3 hours for crosslinking. After taking out from the hot water and drying, the coating film was peeled off from the silicon wafer to obtain a filter sheet X5.

A film thickness of the obtained filter sheet X5 was appropriately 11 μm, a transmittance at a wavelength of 222 nm was 0.2%, a transmittance at a wavelength of 230 nm was 18.9%, and a transmittance at a wavelength of 254 nm was 70.3%. In addition, an average transmittance of the filter sheet X5 at a wavelength of 200 to 230 nm was 16%, an average transmittance at a wavelength of 230 to 280 nm was 71%, and a visible light transmittance was 93%.

The filter sheet X5 was laminated on a surface of the sheet 1A produced in Example 1 on the side of the photosensitive portion opposite to the support to produce a sheet 5B.

The filter sheet X5 in the sheet 5B corresponds to the filter X of the inspection tool according to the first embodiment described above, and the photosensitive portion in the sheet corresponds to the second photosensitive portion A of the inspection tool according to the first embodiment described above.

The sheet 1A produced in Example 1 and the above-described sheet 5B were set in one holding jig, and an inspection tool 5 was produced and evaluated in the same manner as in Example 1. The inspection tool 5 corresponds to the first embodiment, and the first photosensitive portion and the second photosensitive portion contained microcapsules.

Example 6

Two commercially available indicators of a type in which a lamp lit according to illuminance having a wavelength of 220 to 280 nm were prepared.

The indicator included the light receiving section and the display portion described in the third embodiment above.

One of the two indicators was designated as an indicator A and a TAC sheet (FUJITAC Z-TAC, thickness: 60 μm, manufactured by FUJIFILM Corporation) was attached to the light-receiving portion of the other indicator to form an indicator B.

The indicator A included the first light-receiving portion and the first display portion described in the third embodiment above, and the indicator B included the filter X, the second light-receiving portion, and the second display portion described in the third embodiment above.

The indicator A and the indicator B were combined to form an inspection tool 6, and evaluation was performed in the same manner as in Example 1. The inspection tool 6 corresponds to the third embodiment.

Example 7

A mixed solution 4 having the following composition was added to a 5% by mass aqueous solution (202 parts by mass) of polyvinyl alcohol, and then emulsified and dispersed at to obtain an emulsified liquid having a volume average particle diameter of 0.1 μm. The obtained emulsified liquid was continuously stirred at 50° C. for 4 hours. Further, water was added thereto to adjust the concentration, thereby obtaining a polyurethane urea particle dispersion having a concentration of solid contents of 10% by mass.

Composition of Mixed Solution 4

Solvent: ethyl acetate (manufactured by SHOWA DENKO K.K.) 20 parts by mass

Material for forming fine particles: adduct of xylylene diisocyanate and trimethylolpropane (product name "TAKENATE D-110N", manufactured by Mitsui Chemicals, Inc., 75% by weight ethyl acetate solution) 50 parts by mass The obtained polyurethane urea particle dispersion (33 parts by mass), a 6% by mass aqueous solution of polyvinyl alcohol (product name "Denka Size EP-130", manufactured by Denka Company Limited.) (22 parts by mass), glyoxal (manufactured by Daito Chemical Co., Ltd.) (0.05 parts by mass), and a 50% by mass aqueous solution of sodium dodecylbenzenesulfonate (manufactured by DKS Co., Ltd.) (0.09 parts by mass) were mixed with each other to produce a composition for forming filter layer.

The obtained composition for forming a filter layer was applied onto a surface of the sheet 1A opposite to the support such that an applied amount of solid contents was 2 g/m$^2$, and then heated and dried to produce a sheet 7B including the support and the photosensitive portion. In a case where a transmittance was measured by scraping the surface of the sheet 7B on the side opposite to the support so that the upper layer was 1 μm, the transmittance was substantially the same as that of the filter sheet X5 obtained in Example 5.

The sheet 1A and the above-described sheet 7B were set in one holding jig, and an inspection tool 7 was produced and evaluated in the same manner as in Example 1. The sheet 7B set on the holding jig so that the surface opposite to the support was the light-receiving surface.

Example 8

A sheet 8B was produced by laminating TAC sheet (FUJITAC Z-TAC, manufactured by FUJIFILM Corporation, 130 μm, transmittance at a wavelength of 222 nm: 0.0%, transmittance at a wavelength of 230 nm: 0.06%, transmittance at a wavelength of 254 nm: 69.7%, average transmittance at a wavelength of 200 to 230 nm: 0.0%, average transmittance at a wavelength of 230 to 280 nm: 54.0%, visible light transmittance: 92%) to be used.

The sheet 1A and the sheet 8B were set in one holding jig, and an inspection tool 8 was produced and evaluated in the same manner as in Example 1.

Example 9

A mixed solution 1 having the following composition was added to a 5% by mass aqueous solution (202 parts by mass) of polyvinyl alcohol, and then emulsified and dispersed at to obtain an emulsified liquid having a volume average particle diameter of 10 μm. Further, the obtained emulsified liquid was continuously stirred at 50° C. for 4 hours. Further, water was added thereto to adjust the concentration of solid contents, thereby obtaining a 15.9% by mass microcapsule dispersion liquid containing a color-forming agent.

Composition of Mixed Solution 5

Color-forming agent: LEUCO CRYSTAL VIOLET (product name "LCV", manufactured by Yamada Chemical Co., Ltd.) 2.6 parts by mass Organic halogen compound: tribromomethylphenylsulfone (manufactured by SUMITOMO SEIKA CHEMICALS CO., LTD.) 1.3 parts by mass Radical generator: lophine dimer (2,2'-bis(2-chlorophenyl)-4,4',5,5'-tetraphenyl-1,2'-biimidazole, product name "B-IMD", manufactured by KUROGANE KASEI Co., Ltd.) 2.5 parts by mass Solvent: tricresyl phosphate (manufactured by DAIHACHI CHEMICAL INDUSTRY CO., LTD.) 23 parts by mass Solvent: SAS-296 (phenylxylylethane, product name "Nisseki Hisol SAS296", manufactured by JX Nippon Oil and Energy Corp) 8 parts by mass Solvent for producing capsule: ethyl acetate (manufactured by SHOWA DENKO K.K.) 50 parts by mass Light stabilizer: 2,5-bis(1,1,3,3-tetramethylbutyl)hydroquinone (manufactured by TOKYO CHEMICAL INDUSTRY CO., LTD.) 0.3 parts by mass Material for forming capsule wall: adduct of xylylene diisocyanate and trimethylolpropane (product name "TAKENATE D-110N", manufactured by Mitsui Chemicals, Inc., 75% by weight ethyl acetate solution) 50 parts by mass The obtained microcapsule dispersion (20 parts by mass), a 6% by mass aqueous solution of polyvinyl alcohol (product name "Denka Size EP-130", manufactured by Denka Company Limited.) (5 parts by mass), glyoxal (manufactured by Daito Chemical Co., Ltd.) (0.05 parts by mass), and a 50% by mass aqueous solution of sodium dodecylbenzenesulfonate (manufactured by DKS Co., Ltd.) (0.09 parts by mass) were mixed with each other to produce a composition for forming a photosensitive portion.

The obtained composition for forming a photosensitive portion was applied onto a white polyethylene terephthalate sheet (product name "CRISPER K1212", manufactured by Toyobo Co., Ltd.) having a thickness of 188 μm such that an applied amount of solid contents was 10 g/m², and then heated and dried to produce a sheet 9B including the support and the photosensitive portion. A film thickness of the photosensitive portion was approximately 10 μm, and a thickness of the capsule wall was approximately 0.5 μm.

The sheet 1A and the sheet 9B were set in one holding jig, and an inspection tool 9 was produced and evaluated in the same manner as in Example 1.

Example 10 g of 7-(diethylamino)coumarin-3-carboxylic acid (manufactured by FUJIFILM Wako Pure Chemical Corporation) and 1 kg of dried acrylic resin pellets were charged in a container, dispersed by a shaker, and then extruded and mixed with an extrusion kneader to produce pellets. Thereafter, a sheet 10A was produced by forming a sheet using a heat press. In addition, a sheet 2B was produced in the same manner as in Example 2.

The obtained sheet 10A and the sheet 2B were set in one holding jig, and an inspection tool 10 was produced and evaluated in the same manner as in Example 1.

Evaluation of Irradiation at Wavelength of 222 nm

The inspection tools 1 to 10 were evaluated by irradiating them with a wavelength of 222 nm. Specifically, Care 222 (registered trademark) (manufactured by Ushio Inc.) was installed at a position 20 cm away from the inspection tools 1 to 10, and the inspection tools 1 to were irradiated with light having a wavelength of 222 nm until the irradiation amount of the light reached 1 mJ/cm². Thereafter, a visual change before and after the irradiation (color changes for the inspection tools 1 to 5 and 7 to 10, and lamp lighting for the inspection tool 6) was visually observed. In Examples 6 and 10, the visual change was observed only during the irradiation with light, and in Examples 1 to 5 and 7 to 9, the visual change remained even after the irradiation with light. The results are shown in Table 1.

Evaluation of Irradiation at Wavelength of 254 nm

The inspection tools 1 to 10 were evaluated by irradiating them with a wavelength of 254 nm. Specifically, a handy UV lamp SLUV-8 (manufactured by AS ONE Corporation) was installed at a position 20 cm away from the inspection tools 1 to 10, and the inspection tools 1 to were irradiated with light having a wavelength of 254 nm until the irradiation amount of the light reached 3 mJ/cm². Thereafter, a visual change before and after the irradiation (color changes for the inspection tools 1 to 5 and 7 to 10, and lamp lighting for the inspection tool 6) was visually observed. In Examples 6 and 10, the visual change was observed only during the irradiation with light, and in Examples 1 to 5 and 7 to 9, the visual change remained even after the irradiation with light. The results are shown in Table 1.

In Table 1, "White→magenta" indicates that the color changed from white to magenta in the visual evaluation before and after the irradiation, and "White→violet" indicates that the color changed from white to violet in the visual evaluation before and after the irradiation.

TABLE 1

| | | | Irradiation evaluation | | | Irradiation evaluation | |
| --- | --- | --- | --- | --- | --- | --- | --- |
| | Inspection tool | First display portion | Wavelength 222 nm | Wavelength 254 nm | Second display portion | Wavelength 222 nm | Wavelength 254 nm |
| Example 1 | Inspection tool 1 | Sheet 1A | White → magenta | White → magenta | Sheet 1B | No change | White → magenta |
| Example 2 | Inspection tool 2 | Sheet 1A | White → magenta | White → magenta | Sheet 2B | No change | White → violet |
| Example 3 | Inspection tool 3 | Sheet 3A | White → magenta | White → magenta | Sheet 3B | No change | White → magenta |
| Example 4 | Inspection tool 4 | Sheet 4A | White → magenta | White → magenta | Sheet 4B | No change | White → magenta |
| Example 5 | Inspection tool 5 | Sheet 1A | White → magenta | White → magenta | Sheet 5B | No change | White → magenta |
| Example 6 | Inspection tool 6 | Indicator A | Lamp lighting | Lamp lighting | Indicator B | No change | Lamp lighting |
| Example 7 | Inspection tool 7 | Sheet 1A | White → magenta | White → magenta | Sheet 7B | No change | White → magenta |
| Example 8 | Inspection tool 8 | Sheet 1A | White → magenta | White → magenta | Sheet 8B | No change | White → magenta |
| Example 9 | Inspection tool 9 | Sheet 1A | White → magenta | White → magenta | Sheet 9B | No change | White → violet |
| Example 10 | Inspection tool 10 | Sheet 10A | Yellow → blue | Yellow → blue | Sheet 2B | No change | White → violet |

Since the inspection tool produced in each Example included the first display portion and the second display portion, by the visual change, it was possible to easily determine whether or not light which inactivated a virus or the like had been radiated and easily determine whether or not light which was harmful to the human body had been radiated.

More specifically, for example, in a case where the inspection tool 1 of Example 1 was irradiated with light including the light having a wavelength of 222 nm and not including the light having a wavelength of 230 to 280 nm, since the visual change from white to magenta occurred in the first display portion and the visual change did not occur in the second display portion, it could be confirmed that the light which inactivated a virus or the like had been radiated and the light which was harmful to the human body had not been radiated.

On the other hand, in a case where the same irradiation evaluations as in Examples were performed using commercially available UV scale (L type, manufactured by FUJIF- ILM Corporation) and UV label (S type, manufactured by NiGK Corporation), it was not possible to, at the same time, determine whether or not light which inactivated a virus or the like had been radiated and whether or not light which was harmful to the human body had been radiated.

EXPLANATION OF REFERENCES 10, 30, 40: inspection tool
12: support
14: photosensitive portion
16: filter
18: first display portion
20 second display portion
22: holding substrate
42: first photosensitive portion
44: second photosensitive portion B

What is claimed is:

1. An inspection tool comprising:
a first display portion; and
a second display portion,
wherein the first display portion is a display portion which indicates a visual change before and after irradiation of the inspection tool with light having at least any of wavelengths in a wavelength range of 200 to 280 nm, and
the second display portion is a display portion which does not indicate a visual change before and after irradiation of the inspection tool with light in a wavelength range of 200 to 230 nm, but indicates a visual change before and after irradiation of the inspection tool with light having at least any of wavelengths in a wavelength range of more than 230 nm and 280 nm or less,
wherein the second display portion includes a filter and a photosensitive portion,
the filter is disposed to cover a part of a region on a surface of the photosensitive portion, the filter shields light in the wavelength range of 200 to 230 nm and passes light having at least any of wavelengths in the wavelength range of more than 230 nm and 280 nm or less, and
the photosensitive portion indicates a visual change before and after receiving light having at least any of wavelengths in the wavelength range of more than 230 nm and 280 nm or less.

2. The inspection tool according to claim 1,
wherein the visual change is selected from the group consisting of a color change, a pattern change, a brightness change, a lighting change, and a combination of these changes.

3. The inspection tool according to claim 2,
wherein the photosensitive portion contains a color-forming agent.

4. The inspection tool according to claim 2, further comprising:
a first light-receiving portion which receives light having at least any of wavelengths in the wavelength range of 200 to 280 nm;
a filter; and
a second light-receiving portion which receives light having at least any of wavelengths in the wavelength range of more than 230 nm and 280 nm or less, the light have passed through the filter,
wherein the filter shields light in the wavelength range of 200 to 230 nm,
the first display portion indicates the visual change according to a light-receiving amount of the first light-receiving portion, and
the second display portion indicates the visual change according to a light-receiving amount of the second light-receiving portion.

5. The inspection tool according to claim 2,
wherein the second display portion includes a second photosensitive portion which is not exposed to light in the wavelength range of 200 to 230 nm and indicates a visual change before and after being exposed to the light having at least any of wavelengths in the wavelength range of more than 230 nm and 280 nm or less, and
the second photosensitive portion contains a compound which shields light having a wavelength of 200 to 230 nm.

6. The inspection tool according to claim 5,
wherein a transmittance of the compound which shields light having a wavelength of 200 to 230 nm, at a wavelength of 222 nm, is 5% or less, and
a transmittance of the compound which shields light having a wavelength of 200 to 230 nm at a wavelength of 254 nm is 50% or more.

7. The inspection tool according to claim 1,
wherein the photosensitive portion contains a color-forming agent.

8. The inspection tool according to claim 7,
wherein a transmittance of the filter at a wavelength of 222 nm is 5% or less, and
a transmittance of the filter at a wavelength of 254 nm is 50% or more.

9. The inspection tool according to claim 7,
wherein an average transmittance of the filter at a wavelength of 200 to 230 nm is 1% or less, and
an average transmittance of the filter at a wavelength of 230 to 280 nm is 50% or more.

10. The inspection tool according to claim 7,
wherein the filter contains a resin selected from the group consisting of triacetyl cellulose, polyvinyl chloride, an acrylic resin, a methacrylic resin, polyurethane, and polyurea.

11. The inspection tool according to claim 1, further comprising:
a first light-receiving portion which receives light having at least any of wavelengths in the wavelength range of 200 to 280 nm;
a filter; and
a second light-receiving portion which receives light having at least any of wavelengths in the wavelength range of more than 230 nm and 280 nm or less, the light have passed through the filter,
wherein the filter shields light in the wavelength range of 200 to 230 nm,
the first display portion indicates the visual change according to a light-receiving amount of the first light-receiving portion, and
the second display portion indicates the visual change according to a light-receiving amount of the second light-receiving portion.

12. The inspection tool according to claim 1,
wherein a transmittance of the filter at a wavelength of 222 nm is 5% or less, and
a transmittance of the filter at a wavelength of 254 nm is 50% or more.

13. The inspection tool according to claim 1,
wherein an average transmittance of the filter at a wavelength of 200 to 230 nm is 1% or less, and
an average transmittance of the filter at a wavelength of 230 to 280 nm is 50% or more.

14. The inspection tool according to claim 1,
wherein the filter contains a resin selected from the group consisting of triacetyl cellulose, polyvinyl chloride, an acrylic resin, a methacrylic resin, polyurethane, and polyurea.

15. The inspection tool according to claim 1,
wherein the second display portion includes a second photosensitive portion which is not exposed to light in the wavelength range of 200 to 230 nm and indicates a visual change before and after being exposed to the light having at least any of wavelengths in the wavelength range of more than 230 nm and 280 nm or less, and
the second photosensitive portion contains a compound which shields light having a wavelength of 200 to 230 nm.

16. The inspection tool according to claim 15,
wherein a transmittance of the compound which shields light having a wavelength of 200 to 230 nm, at a wavelength of 222 nm, is 5% or less, and
a transmittance of the compound which shields light having a wavelength of 200 to 230 nm at a wavelength of 254 nm is 50% or more.

17. The inspection tool according to claim 15,
wherein the compound which shields light having a wavelength of 200 to 230 nm has any one partial structure selected from the group consisting of an ester bond, a urethane bond, and a urea bond.

18. An inspection method using the inspection tool according to claim 1.

* * * * *